(12) United States Patent
Okamura et al.

(10) Patent No.: US 6,368,448 B1
(45) Date of Patent: Apr. 9, 2002

(54) METHOD FOR JOINING THERMOPLASTIC RESIN MOLDED PRODUCTS

(75) Inventors: Masaharu Okamura, Hiroshima-ken; Toshiki Miyachi, Higashihiroshima; Takeharu Suga, Hiroshima-ken; Nobuyuki Homi, Higashihiroshima, all of (JP)

(73) Assignee: G P Daikyo Corporation, Higashihiroshima (JP)

( * ) Notice: Subject to any disclaimer, the term of this patent is extended or adjusted under 35 U.S.C. 154(b) by 0 days.

(21) Appl. No.: 09/386,948

(22) Filed: Aug. 31, 1999

(30) Foreign Application Priority Data

Jan. 9, 1998 (JP) ............................................. 10-247023

(51) Int. Cl.⁷ .............................................. B29C 65/34
(52) U.S. Cl. ................. 156/274.2; 156/292; 156/309.6; 156/312; 264/248; 264/449
(58) Field of Search .................................. 264/449, 248; 156/273.9, 274.2, 380.2, 329.7, 312, 309.6, 290, 292

(56) References Cited

U.S. PATENT DOCUMENTS

| | | | | |
|---|---|---|---|---|
| 3,527,663 A | * | 9/1970 | Rose et al. | 156/273.9 |
| 4,508,368 A | | 4/1985 | Blumenkranz | 285/21 |
| 4,981,541 A | * | 1/1991 | Stafford | 156/158 |
| 5,320,697 A | * | 6/1994 | Hegler et al. | 156/158 |
| 5,407,520 A | * | 4/1995 | Butts et al. | 156/379.7 |
| 5,500,510 A | * | 3/1996 | Kumagai | 219/505 |
| 5,836,621 A | * | 11/1998 | Campbell | 285/21.2 |
| 5,968,442 A | * | 10/1999 | Sato et al. | 264/449 |

FOREIGN PATENT DOCUMENTS

| | | | |
|---|---|---|---|
| DE | 33 07 162 | | 9/1983 |
| EP | 0 823 321 | | 2/1998 |
| EP | 0 838 325 | | 4/1998 |
| GB | 2177558 A | * | 1/1987 |
| GB | 2269338 A | * | 2/1994 |
| JP | 58-59050 | | 4/1983 |
| JP | 59-118426 | | 7/1984 |
| JP | 62-267125 | | 11/1987 |
| JP | 62-288029 | | 12/1987 |
| JP | 6-64043 | | 3/1994 |
| JP | 10-16061 | | 1/1998 |
| JP | 10-44246 | | 2/1998 |

\* cited by examiner

Primary Examiner—Jan H. Silbaugh
Assistant Examiner—Stefan Staicovici
(74) Attorney, Agent, or Firm—Foley & Lardner

(57) ABSTRACT

A method for joining thermoplastic resin molded products by pressing together joining surfaces of two molded products with electric resistance wire therebetween is provided, wherein the method comprising: a first step in which electric resistance wire 20 is sandwiched between the joining surfaces of two molded products which are to be joined, pressure is applied at a first predetermined pressure, and current of a predetermined value is applied for a predetermined time to the electric resistance wire, so that the resin around the electric resistance wire is melted by the thermal energy produced in the electric resistance wire while the surfaces of the two molded products that are to be joined are held at a predetermined interval; and a second step in which, following the conclusion of the first step, the current being applied to the electric resistance wire is stopped, and a second predetermined pressure is applied to attach the molten resin under pressure.

3 Claims, 29 Drawing Sheets

METHOD FOR JOINING THERMOPLASTIC RESIN MOLDED PRODUCTS

BACKGROUND OF THE INVENTION

The present invention relates to a method for joining thermoplastic resin molded products, and in particular to a joining method using a melt bonding method with electric resistance wire in which the electric resistance wire interposed between the joining surfaces of two molded products that are to be joined is heated by the application of current.

Examples of conventional methods for joining thermoplastic resin molded products include methods in which the joining surfaces that are to be joined are coated with an adhesive to join the surfaces by adhesion, and methods using ultrasonic waves or vibrations, or high frequency electromagnetic induction or electric resistance wires, and the like.

Of these methods, joining methods that feature the use of adhesives are troublesome and time-consuming (specifically, the application of the adhesive is particularly troublesome, and it takes a long time to dry and hold the adhesive under pressure), and the adhesive strength is relatively low, making such methods virtually unusable for products (particularly mass-produced goods) which require a certain level of strength and air-tightness. Joining methods featuring the use of ultrasonic waves or vibrations, or high frequency induction, not only suffer from exorbitant equipment expenses, but the shape of the final product is considerably limited, making it difficult to ensure a satisfactory degree of freedom in the design of the final product.

It is well known, for example, that an intake manifold is connected to a cylinder head in internal combustion engines to feed intake air to the combustion chamber of each cylinder, and that the intake manifold is equipped with a plurality of pipes (equal to the number of cylinders) connected to the engine cylinders and a so-called surge tank that communicates with the intake air feed source. Since intake manifolds are a considerably large object in the air-intake system, their formation with synthetic resins is now being considered as an alternative to conventional light metals (such as aluminum alloys) in order to make the parts around the engine lighter.

The aforementioned intake manifold is used in an air-intake system with lower temperature conditions than the exhaust system, making the application of synthetic resins (particularly types of synthetic resin that are reinforced with fibers or the like) feasible.

When such intake manifolds are manufactured with a synthetic resin, a thermoplastic resin capable of stable strength and rigidity up to a certain temperature is used as the material to form upper and lower halves, which are joined by vibration welding.

More compact engine compartments have led to increasing demand for more compact intake manifolds and mounting structures while ensuring that the pipes are a certain necessary length and that they are designed as much as possible with an equivalent length to ensure good intake characteristics. For that purpose, the pipe shape has developed from relatively linear pipes into bent pipes that have been bent at a predetermined curvature as well as into more complex shaped pipes such as three-dimensionally bent shapes that are not just simple curves but that also have torsion applied thereto. More compact surge tanks have also led to demand to concentrate the connections between the plurality of pipes and the surge tank in as narrow a space as possible, which has also resulted in the need for pipes with more complex shapes.

That is, it is essential to ensure an adequate degree of freedom in the design of the shape of manufactured parts in these cases.

The use of a joining method based on welding with electric resistance wire to exploit the thermal energy produced by the electrification of the electric resistance wire is preferred as an alternative to the aforementioned vibration welding in order to ensure a certain level of bonding strength and air-tightness as well as better productivity during mass production and also to improve the degree of freedom in the design of the shapes of manufactured products in cases where intake manifolds are produced with synthetic resin.

Such a joining method based on melt bonding with electrical resistance wire is described in greater detail, for example, in Japanese Patent Laid-Open Publications 58-59050, 59-118426, 62-267125, 62-288029, 06-64043, 10-16061, and 10-44246, where electric resistance wire is electrified while pressed between the joining surfaces of components that are to be joined, so that the resin around the electric resistance wire is fused by thermal energy and bonded under pressure, the shape of the electric resistance wire being formed to conform to the shape of the surfaces being joined so that products with more complex shapes can be accommodated relatively easily.

The joining methods based on melt bonding with electrical resistance wire disclosed in the aforementioned publications all feature the use of resin materials which can be melted relatively easily, but since they are carried out until final pressurization while the wire is electrified, it is generally difficult to establish electrification and pressurization conditions, making these methods difficult to use without modification, particularly with materials which have a certain level of high strength and high air-tightness and which are difficult to melt.

That is, problems which occur are that, depending on the electrification and pressurization conditions, the resin of the joined parts can be difficult to melt adequately, or conversely the resin can decompose as a result of overheating, or unwanted gases can be produced, making it difficult to consistently obtain high strength and air-tightness characteristics in the parts that are joined.

SUMMARY OF THE INVENTION

In view of the foregoing technical drawbacks, an object of the present invention is to provide a method for joining thermoplastic resin molded products together, wherein the resin of the joined parts can be suitably melted so as to ensure satisfactorily high strength and air-tightness in the joined parts when thermoplastic resin molded components are joined together using the melt bonding method with electric resistance wire.

According to a first aspect of the present invention, there is provided a method for joining thermoplastic resin molded products together by pressing together the joining surfaces of two molded products that are to be joined, with electric resistance wire therebetween, when such thermoplastic resin molded products are to be joined together, and by applying current to heat the electric resistance wire, so that the resin around the electric resistance wire is melted and bonded under pressure to join the two molded products, wherein the method for joining thermoplastic resin molded products is characterized by comprising: a first step in which electric resistance wire is sandwiched between the joining surfaces of two molded products which are to be joined, pressure is applied at a first predetermined pressure, and current of a predetermined value is applied for a predetermined time to the electric resistance wire, so that the resin around the electric resistance wire is melted by the thermal energy produced in the electric resistance wire while the joining surfaces of the two molded products are held apart at a predetermined interval; and a second step in which, following the conclusion of the first step, the current being applied to the electric resistance wire is stopped, and a second predetermined pressure is applied to join the molten resin under pressure.

In the method for joining thermoplastic molded products according to the first aspect of the present invention, the resin around the electric resistance wire is melted by thermal energy that is produced in the electric resistance wire while the joining surfaces of the two molded products that are to be joined together are held a certain distance apart in a first stage in which the electric resistance wire is sandwiched between the surfaces of the two aforementioned molded products that are to be joined, and current of a predetermined value is applied for a predetermined time to the electric resistance wire as a first predetermined pressure is applied, allowing a satisfactory molten state of resin to be obtained in a reliable manner by ensuring that thermal energy is provided to the resin around the electric resistance wire without exorbitant increases in the temperature of the electric resistance wire (that is, without causing the material resin to decompose or producing unwanted gas). Upon the conclusion of this first step, a second step in carried out, in which the current to the aforementioned electric resistance wire is terminated, and a second predetermined pressure is applied to join the molten resin under pressure, allowing the resin of the joined portions to be joined under pressure in a reliable manner.

That is, according to the method of the first aspect of the present invention, two stage pressurization is carried out in which the action of the pressure between the two joining surfaces is divided between first and second steps, so that the electric resistance wire can be electrified and heated while the joining surfaces are held apart a certain distance in the first step, and the surfaces that are to be joined together can then be joined under pressure to the final joining position in the second step in order to ensure that the two molded components are joined together under pressure. Consequently, the resin of the joined portions can be suitably melted and joined under pressure in a more reliable manner, and the joined portions where the molded products being joined together can be provided with more satisfactory high bonding strength and air-tightness than when the joining surfaces are joined together under pressure in the final joining position in a one-stroke pressurization step (single stage pressurization) while the electric resistance wire is electrified and heated, as in the past.

Also, according to a second aspect of the present invention, based on the above invention, gapping means for holding at a predetermined interval the joining surfaces of the two molded products is provided in the first step only.

In this case, since, in particular, a gapping means for holding apart at a certain distance the joining surfaces of the two aforementioned molded products is provided only in the aforementioned first step, the aforementioned joining surfaces can be held a certain distance apart from each other in a reliable manner in the first step.

Further, according to a third aspect of the present invention, based on the above invention, the gapping means is a spacer of predetermined thickness, the spacer being interposed between the two molded products in the first step, and being removed from between the molded products in the second step.

In this case, since, in particular, the aforementioned gapping means is, specifically, a spacer of predetermined thickness, and since the spacer is interposed between the two molded products in the aforementioned first step, and is then removed from between the aforementioned molded products in the aforementioned second step, the aforementioned joining surfaces can be held apart a certain distance in a more reliable manner in the first step.

Furthermore, according to a fourth aspect of the present invention, based on the above invention, the gapping means is unified with at least one of the two molded products, the gapping means being deformed by the action of the second predetermined pressure in the second step so as to narrow the space between the joining surfaces of the two molded products that are to be joined.

In this case, in particular, the aforementioned gapping means is formed in a unified manner with at least one of the two aforementioned molded products, and this gapping means is deformed by the action of the second predetermined pressure in the aforementioned second step, so that the space between the joining surfaces of the two aforementioned molded products that are to be joined is narrowed, making it unnecessary to set up a gapping means separately from the molded product, and also eliminating the trouble of removing the gapping means following the conclusion of the first step.

Furthermore, according to a fifth aspect of the present invention, based on the above invention, either of the molded products has a hole in at least the joining surface that is to be joined, and the other molded product has an annular junction that can be fitted to the hole.

In this case, in particular, one of the aforementioned molded products has a hole in at least the joining surface that is to be joined, and the other molded product has an annular junction that is fitted to the aforementioned hole, making it possible to join the two molded products together in a relatively easier and more reliable manner.

Furthermore, according to a sixth aspect of the present invention, based on the above invention, either of the molded products is a hollow element having an opening in at least the joining surface that is to be joined, and the other molded product is a tubular element with a connecting portion that can be joined to the opening.

In this case, in particular, one of the aforementioned molded products is a hollow element having an opening in at least the joining surface that is to be jointed, and the other molded product is a tubular element having a connecting potion that is joined to the aforementioned opening, allowing the portion where the molded products are joined to be provided with satisfactorily high bonding strength and air-tightness when the hollow element and tubular element are joined.

DETAILED DESCRIPTION OF THE PREFERRED EMBODIMENTS

Embodiments of the present invention are described in detail below with reference to the attached drawings using the parts of a synthetic resin intake manifold as an example of the parts that are joined together.

Figure 1:
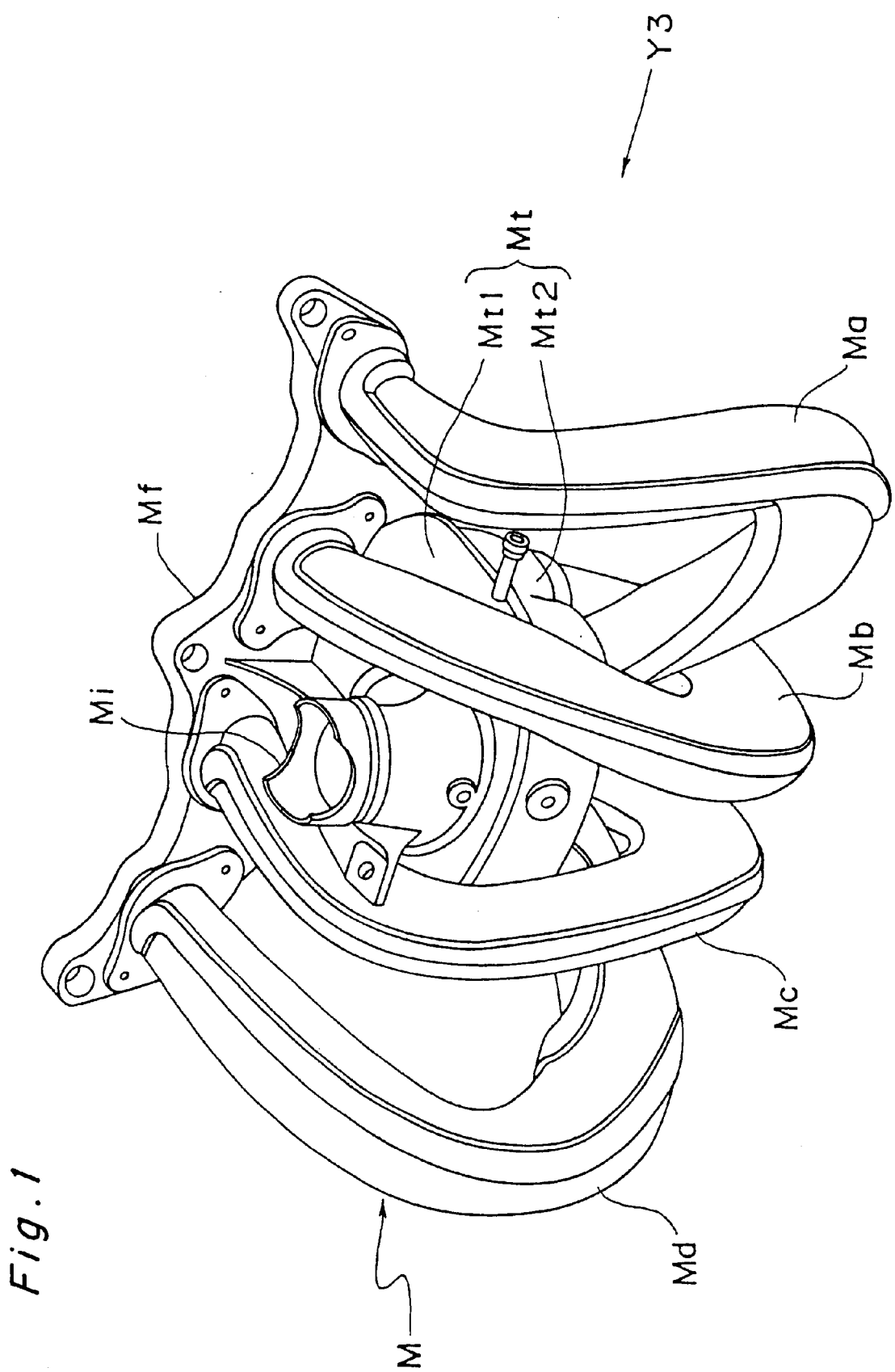
FIG. 1 is an oblique view of the entire intake manifold in a first embodiment of the present invention.
Figure 2:
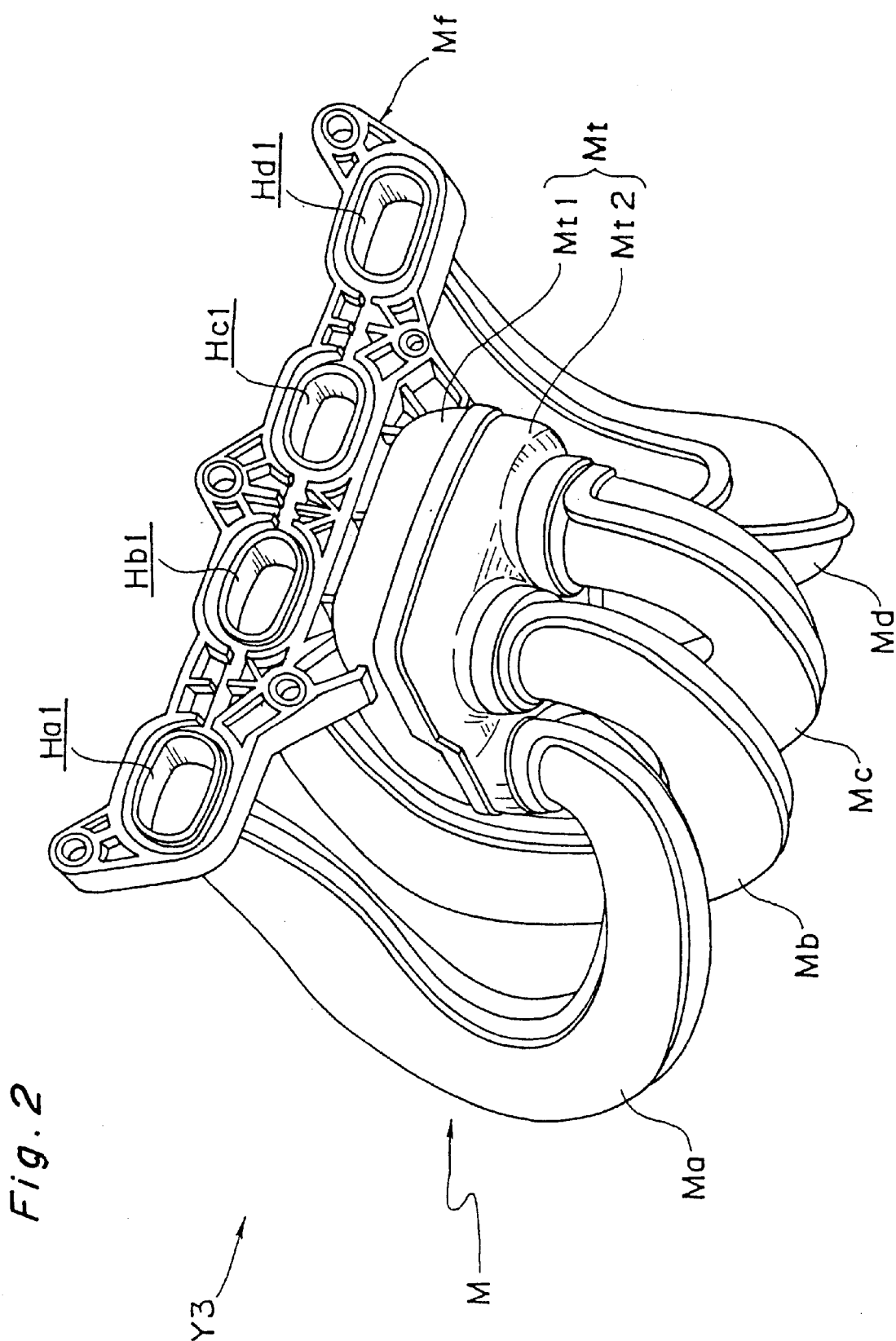
FIG. 2 is an oblique view of the entire intake manifold as seen from a different direction than that in FIG. 1.
Figure 3:
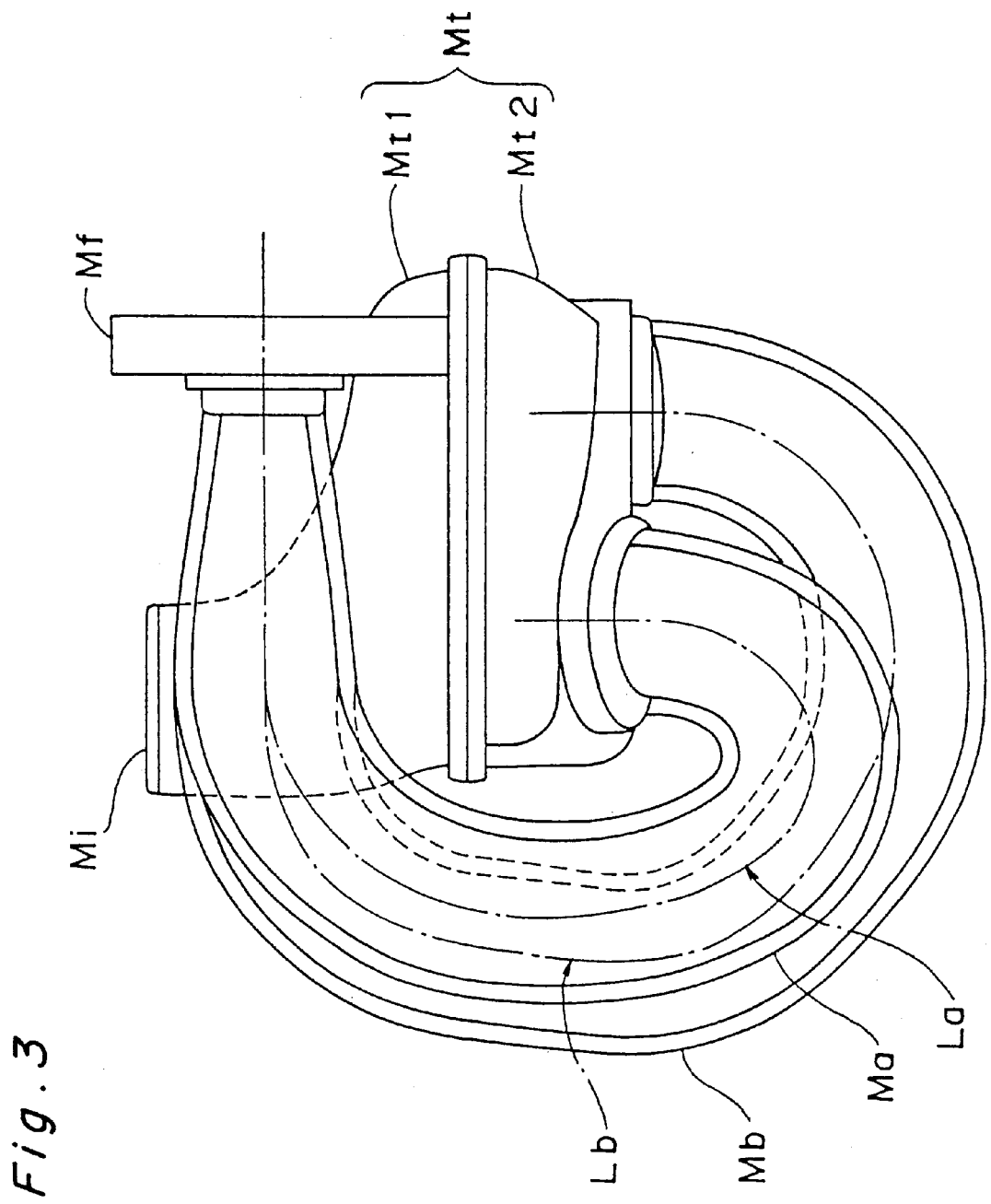
FIG. 3 is a side view of the intake manifold as seen from the direction indicated by arrow Y3 in FIG. 1 or 2.

FIGS. 1 and 2 are oblique views of a synthetic resin intake manifold M in the present embodiment, as viewed from different directions. FIG. 3 is an illustration of the side view, as seen from the direction indicated by arrow Y3 in FIGS. 1 and 2.

The aforementioned intake manifold M is equipped with a plurality (number equivalent to number of engine cylinders: four in this case) of outlet pipes Ma through Md and a surge tank Mt as the air-intake volume component communicating with the intake air feed source via an inlet pipe Mi.

The aforementioned surge tank Mt and outlet pipes Ma through Md of the intake manifold M are made of a resin by injection molding, and are then assembled and joined together.

Although not specifically shown in the figure, the aforementioned inlet pipe Mi is connected to an equipment on the upstream side of the air-intake system such as an air cleaner, and guides air from outside the vehicle flows through the equipment on the upstream side of the air-intake system into the surge tank Mt.

The ends (down stream ends) of the aforementioned outlet pipes Ma through Md are connected to the cylinders of the engine (not shown) through a port flange Mf serving as the mounting component, and the other ends (upstream ends) are connected to the aforementioned surge tank Mt. Openings Ha1 through Hd1 corresponding to the engine cylinders are formed in the aforementioned port flange Mf, and the down stream ends of the outlet pipes Ma through Md are attached to the back side of the port flange Mf in such a way that the openings of passages for the outlet pipes Ma through Md are aligned with the aforementioned openings Ha1 through Hd1.

Figure 6:
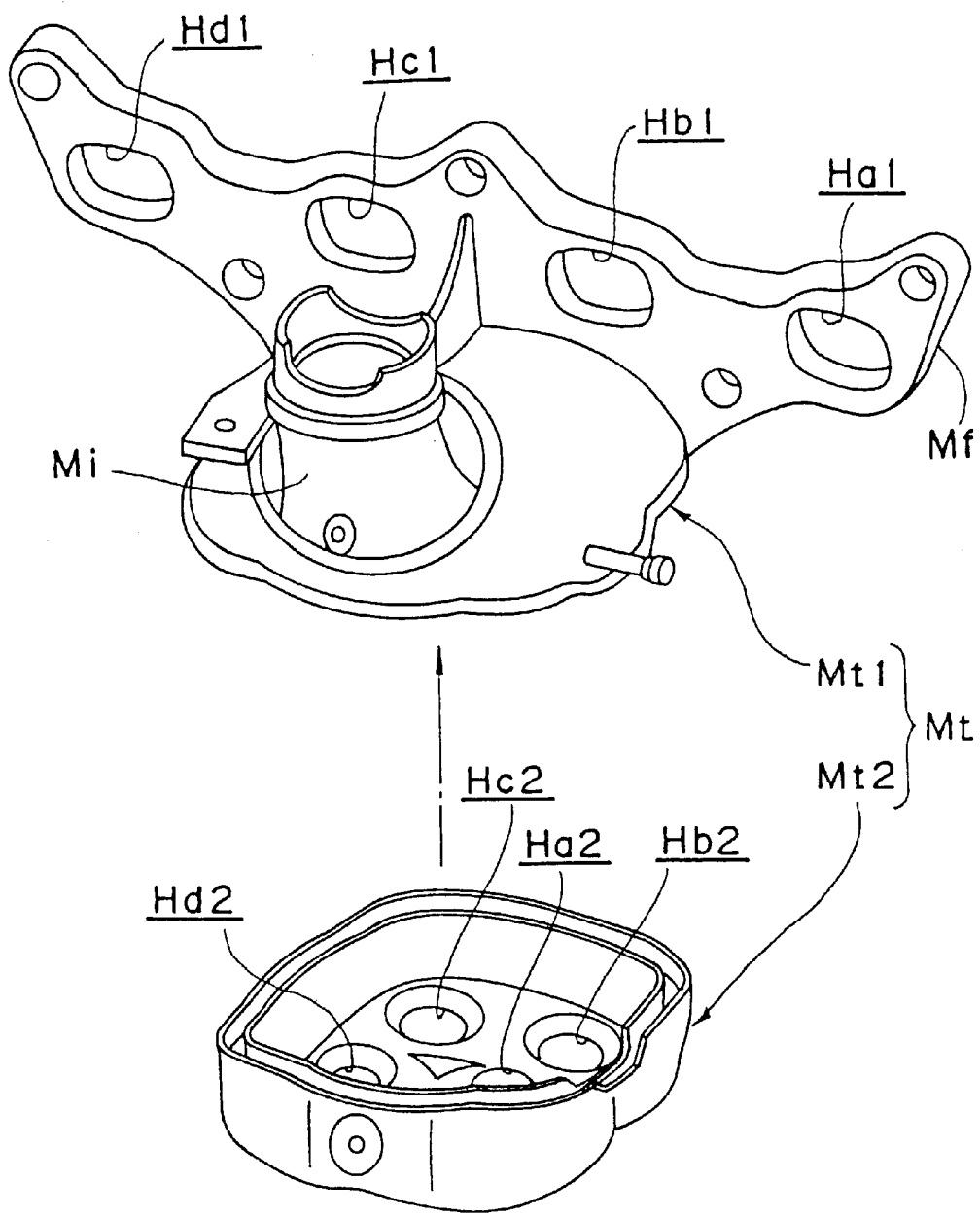
FIG. 6 is an exploded oblique view of the surge tank of the intake manifold.
Figure 7:
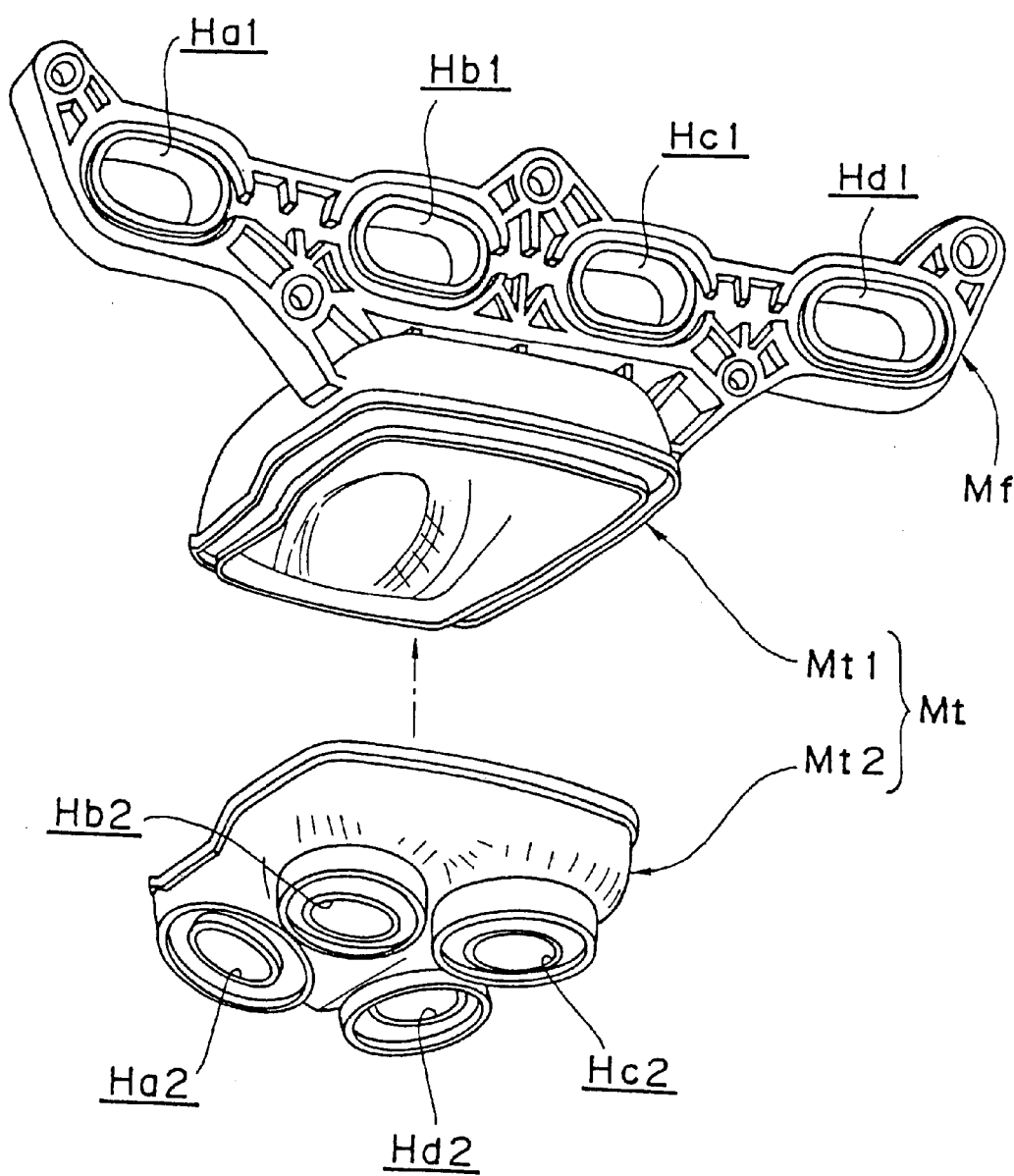
FIG. 7 is an oblique view of the surge tank as seen from a different direction than that in FIG. 6.

As shown in FIGS. 6 and 7, the aforementioned surge tank Mt is composed of a upper half Mt1 and lower half Mt2, with four openings Ha1 through Hd2 formed in the lower half Mt2.

The upstream ends of the outlet pipes Ma through Md are attached to the under side (that is, the under side of the lower half Mt2) of the surge tank Mt in such a way that the openings of passages for the outlet pipes Ma through Md are aligned with the aforementioned openings Ha2 through Hd2.

To obtain the surge tank Mt, the upper and lower halves are preferably molded in a molding die assembly by the so-called die rotary injection (DRI) process using a pair or rotating injection molding dies capable of being reciprocally rotated relative to each other, and the two halves are brought into abutment and joined with each other in the molding die assembly, so that the two aforementioned halves are joined together every rotating cycle of the mold, resulting in a hollow, complete molded product (surge tank Mt). The outlet pipes Ma and Md are also composed of pairs of assembled halves, and are preferably obtained in the form of hollow, complete molded products (outlet pipes) by joining the halves together every rotating cycle of the molding die assembly by means of the aforementioned DRI method.

The molding die assembly used in the DRI method is not specifically illustrated, but is combined so that they can be opened and closed relative to each other, where one molding die can be rotated at a predetermined angle relative to the other, and the die surface of each molding die is provided with a molding section comprising at least one male molding portion and two female molding portions in a male/female/female repeating sequence in the rotating direction at the aforementioned predetermined angle.

Figure 8:
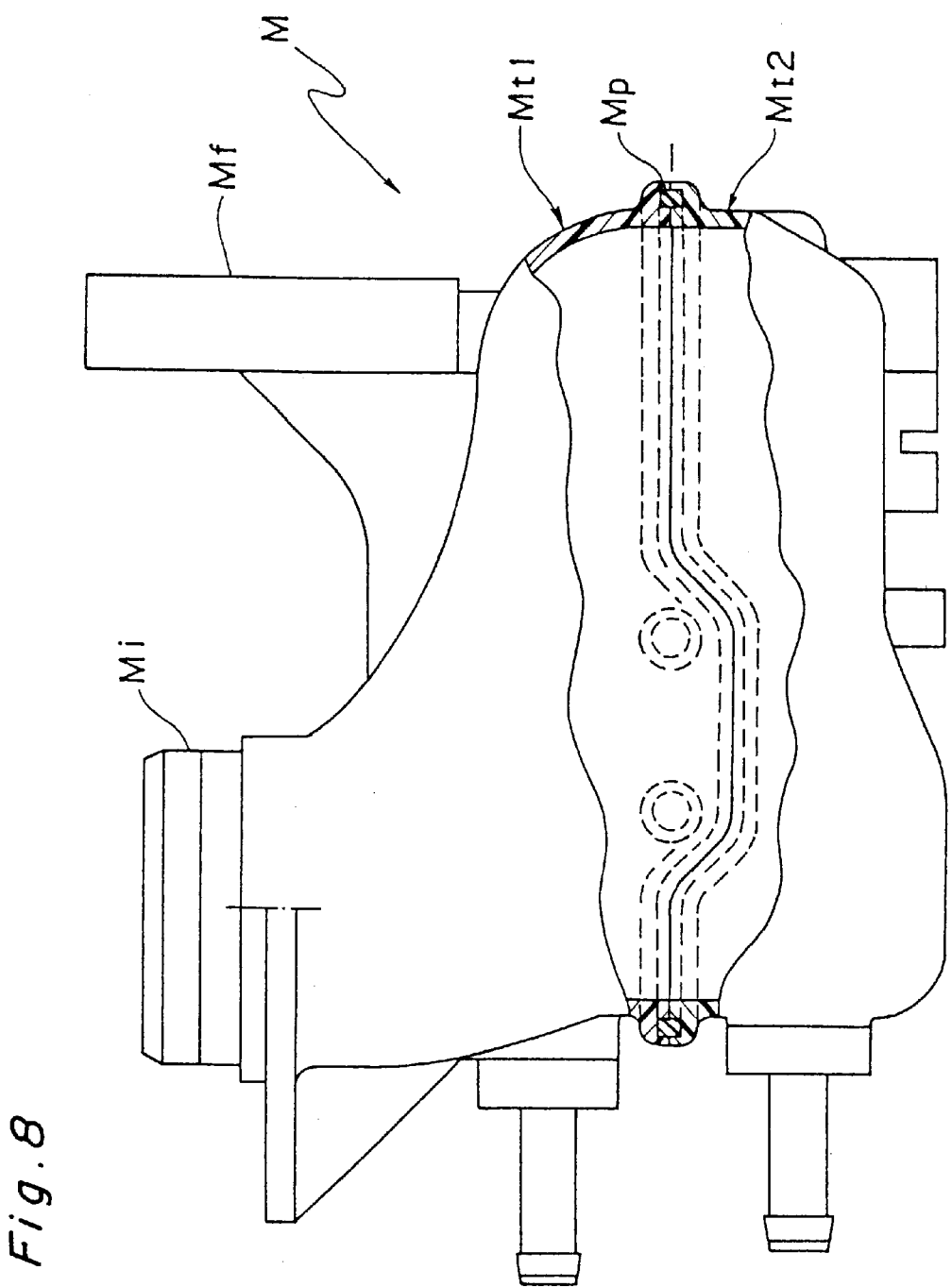
FIG. 8 is a partial vertical cross section of the intake manifold.

In the case of the surge tank Mt, for example, the abutted portions of the aforementioned upper and lower halves are provided, as shown in FIG. 8, with internal passages Mp in the form of grooves with a closed cross section preferably formed in the walls of the halves Mt1 and Mt2 along the outer circumference of the abutting surfaces of the upper half Mt1 and lower half Mt2. The internal passages Mp are filled with resin (secondary resin), after the upper and lower halves Mt1 and Mt2 have been brought into abutment against each other, so as to join the two halves together.

The aforementioned internal passages Mp may be formed with a closed cross section in the walls of the two halves Mt1 and Mt2 as described above. Alternatively, a portion of the internal passage may be open when the two halves are brought into abutment with each other, and the halves may be set up in a predetermined molding die in such a way that the aforementioned opening is closed off by the surface of the molding die, forming a closed cross section.

Although not specifically illustrated, the aforementioned outlet pipes Ma through Md may similarly be provided with interior passages in the abutted portions of the halves, in the same manner as in the case of the aforementioned surge tank Mt, and the interior passages may be filled with secondary resin to join the two halves together.

Figure 5:
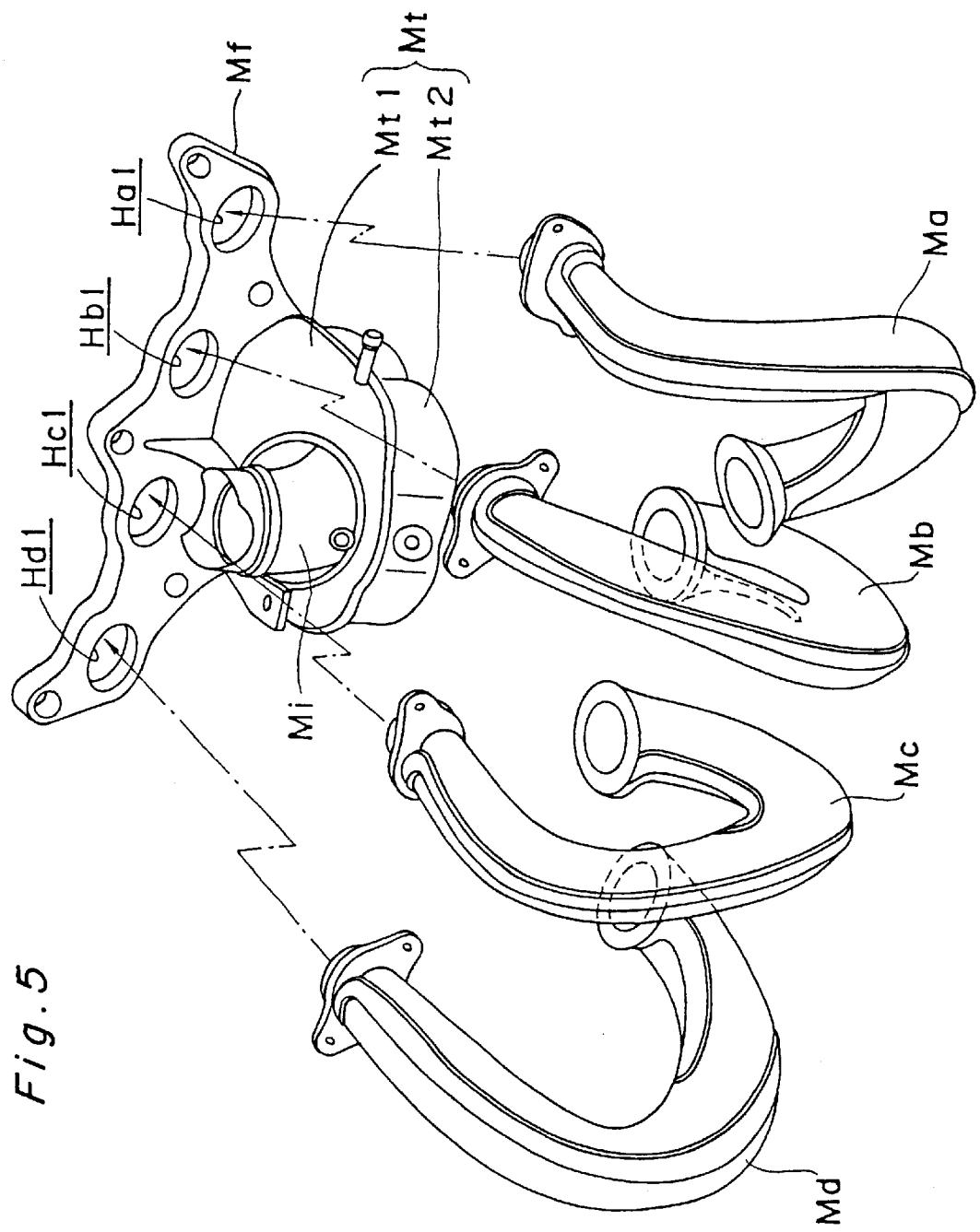
FIG. 5 is an exploded oblique view of the intake manifold.

The outlet pipes Ma through Md obtained in the form of complete products by the DRI method in the manner described above are then mounted, as indicated in FIG. 5, to the surge tank Mt similarly obtained in the form of a complete product by the same DRI method, and the upstream ends are joined to the aforementioned port flange Mf, while the down stream ends are joined to the lower half Mt2.

The manner in which the ends of the outlet pipes Ma through Md are joined to the surge tank Mt is described in detail below.

Figure 4:
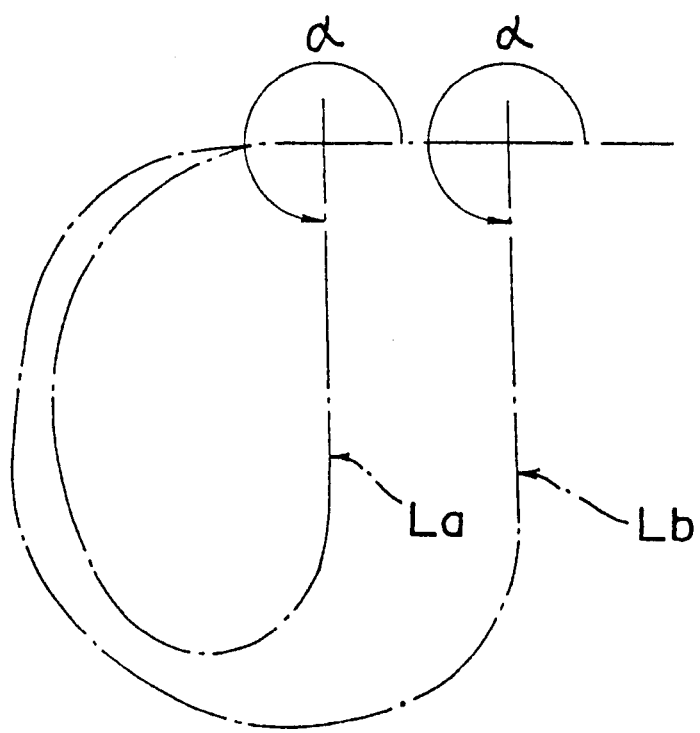
FIG. 4 is a schematic illustration of the angles formed in the side plane perspective by the two ends in the axial direction of the outlet pipes of the intake manifold.

The aforementioned outlet pipes Ma through Md are preferably formed of bent pipes. As schematically shown in FIG. 4, both ends of axial lines (shown only as the axial lines La and Lb of the outlet pipes Ma and Mb in FIGS. 3 and 4; the shapes of the outlet pipes Mc and Md are laterally symmetrical to the outlet pipes Mb and Ma, respectively) form a predetermined angle α of about 180 degrees or more (α=about 270 degrees in the present embodiment) relative to the bending direction of the outlet pipes, as viewed from the side plane.

The intake manifold M and its mounting structure can thus be made more compact while still ensuring that the outlet pipes Ma through Md are a certain necessary length and that the outlet pipes Ma through Md are designed as much as possible with an equivalent length to ensure good air-intake characteristics.

The aforementioned port flange Mf is preferably molded in a unified manner with the surge tank Mt while the surge tank Mt (specifically, the upper half Mt1 of the surge tank Mt) is being molded.

Since the port flange Mf, which is the mounting piece for connecting one end of the outlet pipes Ma through Md to the engine cylinders, is thus formed in a unified manner with the surge tank Mt as the aforementioned surge tank Mt is being injection molded, the number of parts can be reduced, allowing productivity to be even further increased.

In this embodiment, a polyamide resin, which is a thermoplastic resin, especially nylon 6 resin, with approximately 30 wt % reinforcing glass fiber added, is used as the material for the aforementioned surge tank Mt and outlet pipes Ma through Md.

Examples of other materials which can be used include polyethylene resin, polypropylene resin, AS resin, ABS resin, methacrylic resin, polyvinyl chloride resin, PBT resin, and TPO resin, either alone or with a reinforcer (such as glass fiber or carbon fiber).

The method for joining the ends of the outlet pipes Ma through Md of the aforementioned intake manifold to the surge tank Mt side is described below.

The method for joining the upstream ends of the outlet pipes Ma through Md to the lower half Mt2 of the surge tank Mt is described first, using as a primary example a case in which the upstream end of the outlet pipe Mb is joined to the opening Hb2 of the surge tank Mt.

Figure 9:
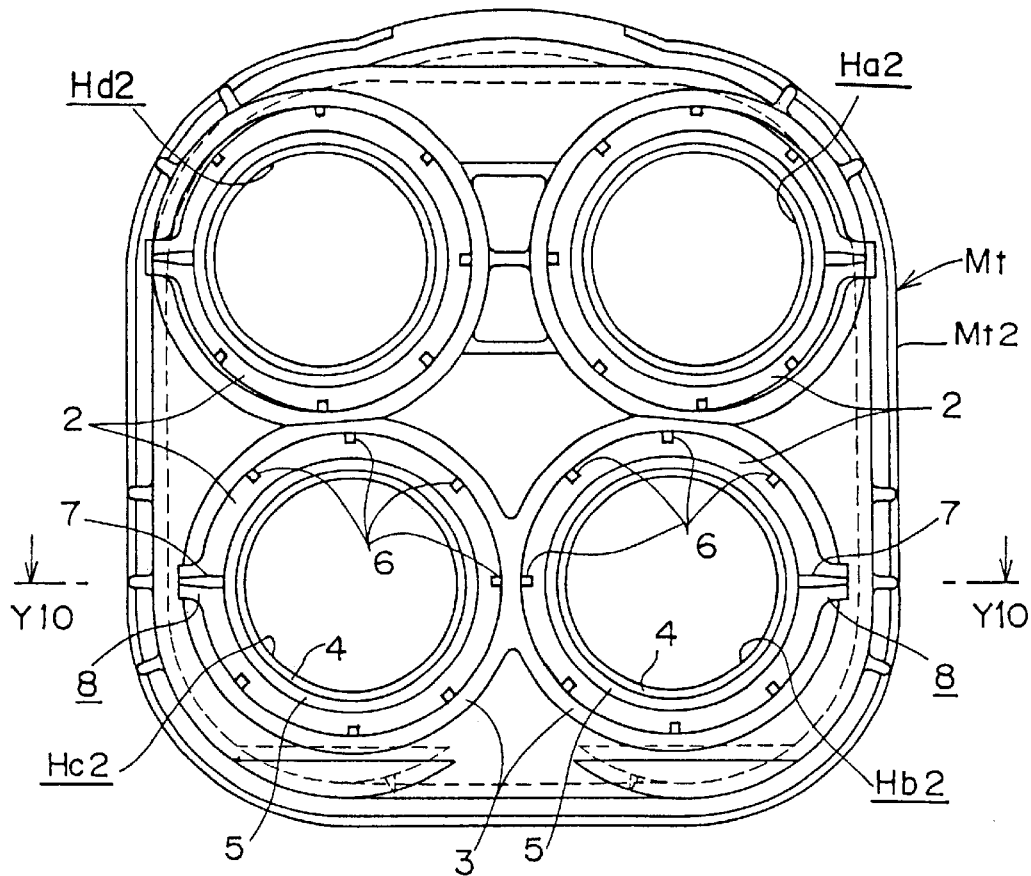
FIG. 9 is a bottom view of the surge tank.
Figure 10:
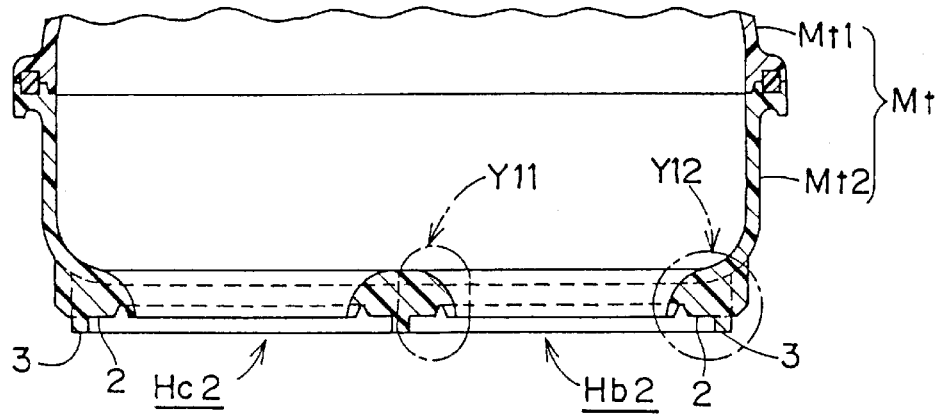
FIG. 10 is a vertical cross section taken along line Y10—Y10 in FIG. 9.

FIGS. 9 and 10 depict the bottom surface of the aforementioned surge tank Mt and openings Ha2 through Hd2 provided therein. The port flange Mf is not depicted in these drawings.

Figure 11:
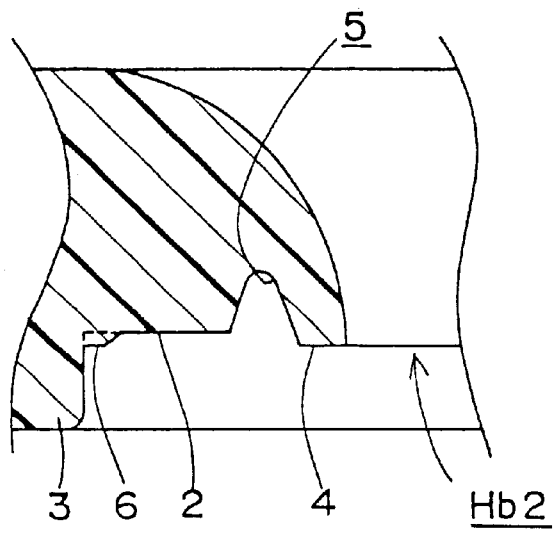
FIG. 11 is a vertical cross section showing an enlargement of component Y11 in FIG. 10.
Figure 12:
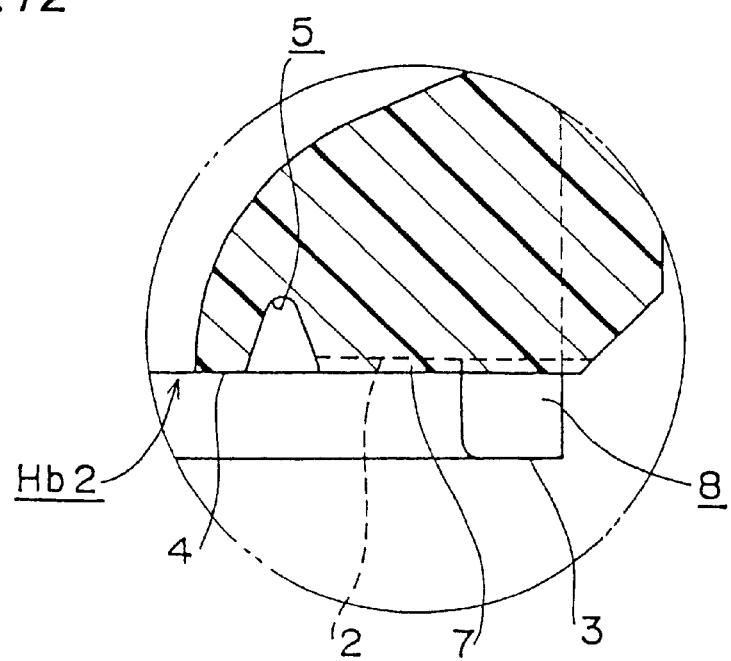
FIG. 12 is a vertical cross section showing an enlargement of component Y12 in FIG. 10.

An annular pipe-positioning rib 3 for controlling radial shifts of the pipe axis of the outlet pipe Mb is provided along the outer periphery of the surface 2 that is to be joined in the joining portion (peripheral portion of the opening Hb2) where the surge tank Mt joins the outlet pipes (represented by outlet pipe Mb in the example). As shown in detail in FIGS. 11 and 12, an annular stopper 4 is also provided for positioning in the axial direction by restraining the outlet pipe Mb along the inner periphery of the surface 2 which is to be joined (that is, along the opening Hb2). As will be described in detail below, the side (outer periphery) of the stopper 4 is provided with an annular resin trough 5 to catch excess molten resin that is produced when the outlet pipe Mb is joined under pressure.

In this embodiment, the inner periphery diameter of the aforementioned pipe positioning rib 3 is about 52 [mm]. The height of the aforementioned stopper 4 from the surface 2 which is to be joined is about 0.4 [mm].

The inside connecting base of the aforementioned pipe positioning rib 3 is provided, along the inner periphery of the pipe positioning rib 3, with a plurality (seven, for example, in this embodiment) of protruding resistance wire positioning ribs 6 for the radial positioning of the electric resistance wire, as described below.

As described in detail below, a recessed portion 8, which is preferably stepped so as to form a surface in common with the surface 2 that is to be joined, is formed corresponding to the terminal connections of the electric resistance wire in a predetermined location around the pipe positioning rib 3, and the recessed portion 8 is provided with a joining supplementary resin rib 7 to compensate for the amount of molten resin.

The various joining portions (peripheral portions of openings Ha2, Hc2, and Hd2) of the surge tank Mt for the other outlet pipes Ma, Mc, and Md are formed in the same manner as in the case of the aforementioned opening Hb2.

Figure 13:
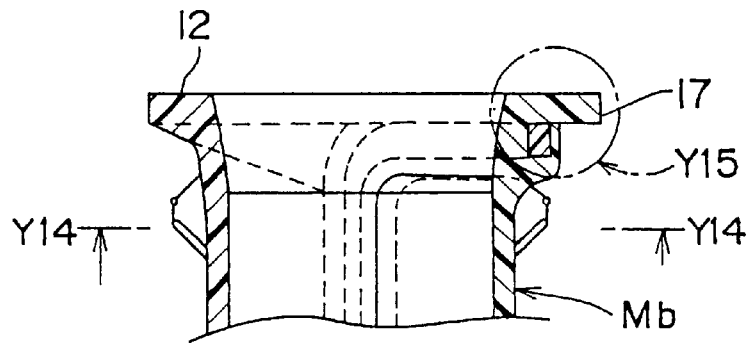
FIG. 13 is a vertical cross section of the upstream end of the outlet pipe connected to the surge tank.
Figure 14:
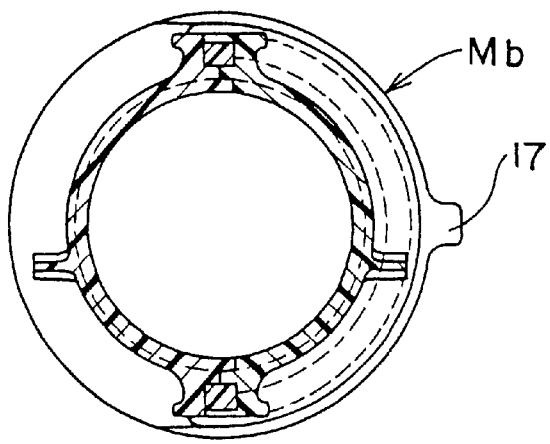
FIG. 14 is a vertical cross section taken along line Y14—Y14 in FIG. 13.
Figure 15:
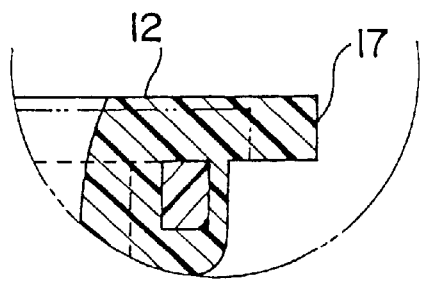
FIG. 15 is a vertical cross section showing an enlargement of component Y15 in FIG. 13.

As shown in FIGS. 13 through 15, meanwhile, the upstream ends of the outlet pipes (here, represented by the outlet pipe Mb) are formed in the shape of a flange, with the end of the pipe radially spread out, and a protrusion 17 corresponding to the terminal connections of the electric resistance wire (in other words, corresponding to the recessed portion 8 formed in the pipe positioning rib 3 on the surge tank Mt side) is provided in a predetermined location around the surface 2 that is to be joined.

The upstream ends of the outlet pipes Ma through Md are joined after being mounted to the bottom surface of the surge tank Mt (that is, to the bottom surface of the lower half Mt2), so that the openings of the passages of the outlet pipes Ma through Md are aligned with the aforementioned openings Ha2 through Hd2, and so that the protrusions 17 of the outlet pipes Ma through Md fit into the recessed portions 8 on the surge tank Mt side.

Figure 16:
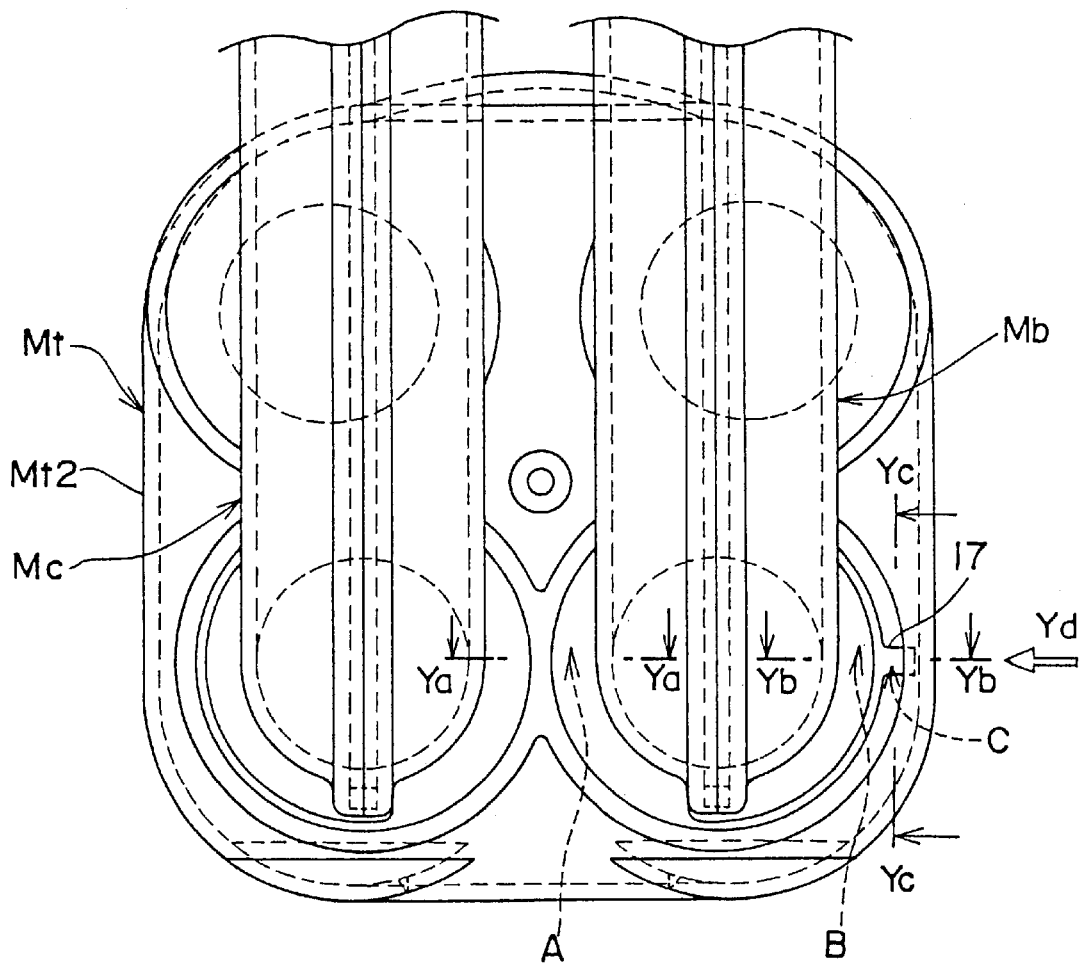
FIG. 16 is a bottom view of the outlet pipes connected to the surge tank.
Figure 21:
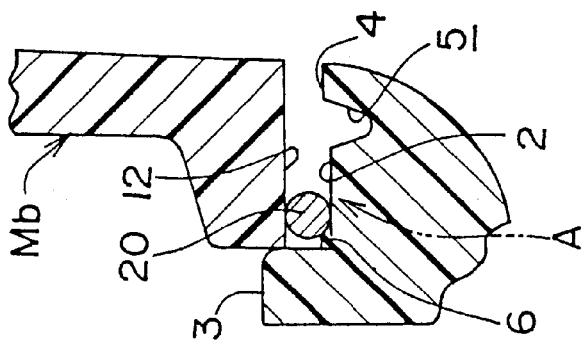
FIG. 21 is a vertical cross section of the set state of an outlet pipe and the surge tank of the intake manifold at junction A (part shown in cross section by line Ya—Ya in FIG. 16)
Figure 22:
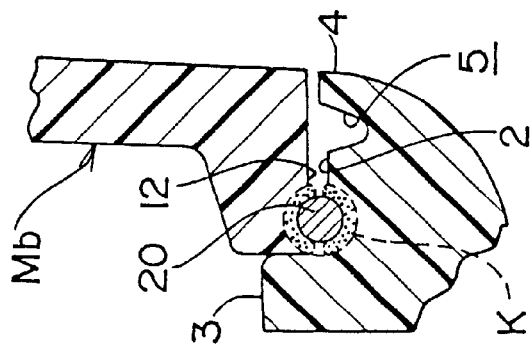
FIG. 22 is a vertical cross section of the state at Junction A at the end of the first step.
Figure 23:
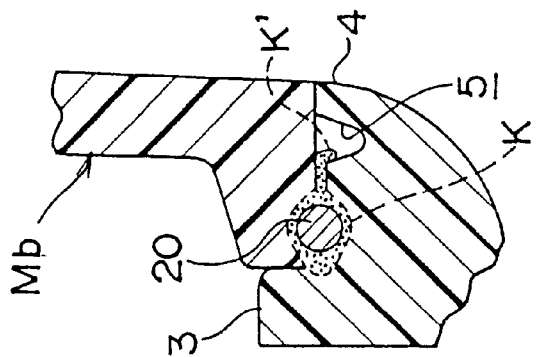
FIG. 23 is a vertical cross section of the state at Junction A at the end of the second step.
Figure 29:
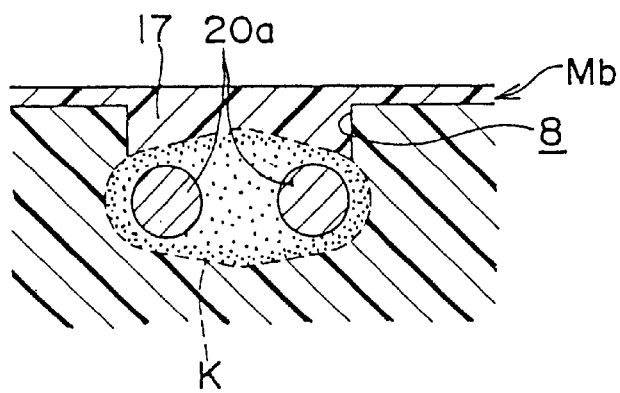
FIG. 29 is a vertical cross section of the state at Junction C at the end of the second step.
Figure 30:
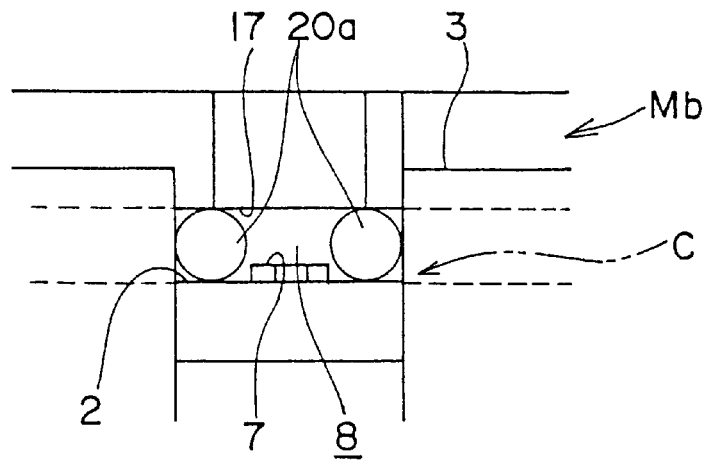
FIG. 30 depicts the set state of an outlet pipe and the surge tank of the intake manifold at junction C (part shown in cross section by line Yc—Yc in FIG. 16) as seen from the direction indicated by arrow Yd.
Figure 31:
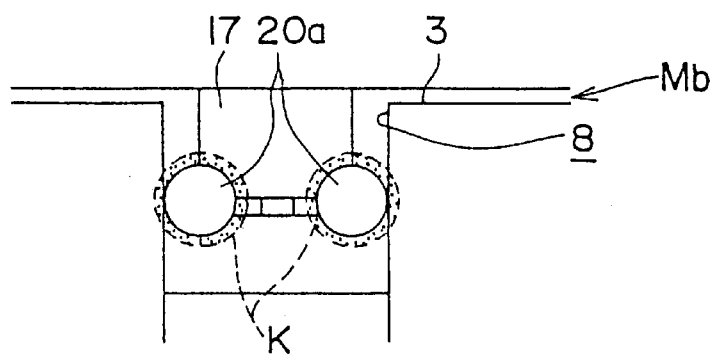
FIG. 31 depicts the state of junction C at the end of the first step as seen from the direction indicated by arrow Yd.
Figure 32:
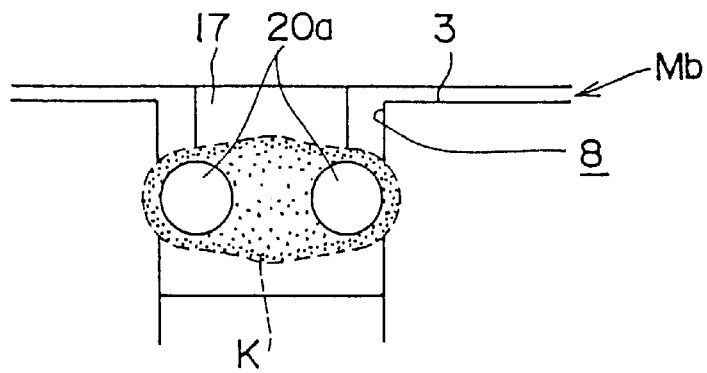
FIG. 32 depicts the state of junction C at the end of the second step as seen from the direction indicated by arrow Yd.

FIG. 16 depicts the bottom surface of the surge tank Mt to which the upstream ends of the outlet pipes Mb and Mc are connected. The step for joining (by melt bonding) the outlet pipe Mb to the surge tank Mt at a junction A is depicted in FIGS. 21 through 23 (cross section taken along line Ya—Ya in FIG. 16), at junction B in FIGS. 24 through 26 (cross section taken along line Yb—Yb in FIG. 16), and at junction C in FIGS. 27 through 29 (cross section taken along line Yc—Yc in FIG. 16). FIGS. 30 through 32 depict the joining step at junction C as viewed from the direction indicated by the outlined white arrow Yd in FIG. 16.

Figure 17:
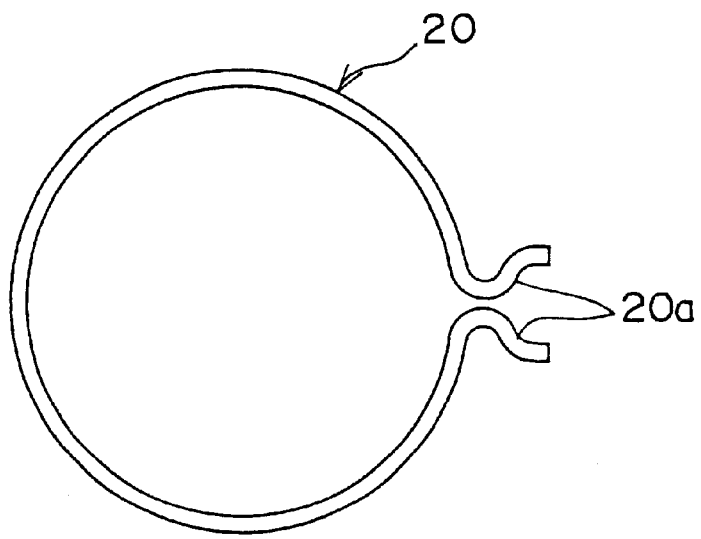
FIG. 17 is a front view of the electric resistance wire in an embodiment of the invention.

FIG. 17 is a front view of the electric resistance wire 20 used to join the upstream end of the aforementioned outlet pipe Mb to the surge tank Mt. As illustrated in the figure, the entire electric resistance wire 20 is formed in the shape of a generally circular ring (round heat producing portion), and is open only at the terminal connections 20a and 20a. The tips of the pair of terminal connections 20a and 20a are further opened in the form of arches. That is, the aforementioned electric resistance wire 20 has an overall front view generally in the form of the Greek symbol Ω.

An iron-chromium alloy was used as the material for the aforementioned electric resistance wire 20 in this embodiment. Other examples which can be used include iron, nickel-chromium alloys, and iron-nickel alloys. Despite the absence of any significant difference in the welded state at the joined portions using the aforementioned materials, iron was excluded because of problems with rusting. Iron-chromium alloy (type 1) which passed corrosion tests and which was inexpensive was used.

Figure 18:
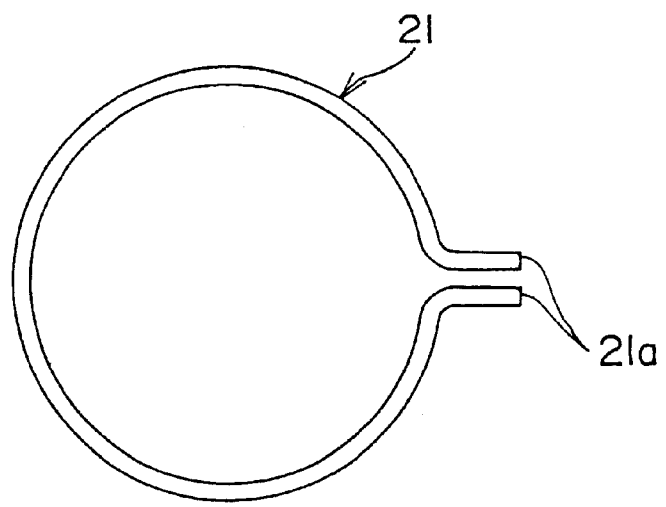
FIG. 18 is a front view of a variation of the electric resistance wire.
Figure 19:
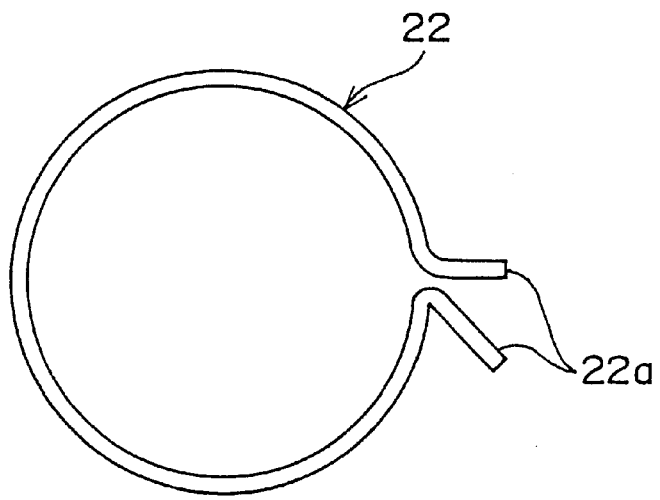
FIG. 19 is a front view of another variation of the electric resistance wire.
Figure 20:
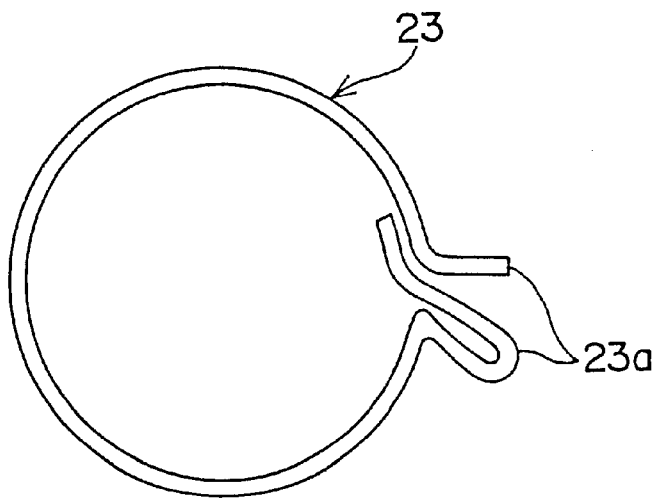
FIG. 20 is a front view of yet another variation of the electric resistance wire.

The examples shown in FIGS. 18 through 20 can also be used as shapes for the electric resistance wire in addition to that shown in FIG. 17. A pair of terminal connections 21a and 21a are linearly extended in the electric resistance wire 21 shown in FIG. 18. In the electric resistance wire 22 shown in FIG. 19, only one of the pair of terminal connections 22a is opened in an inclined direction at a predetermined angle. In the electric resistance wire 23 shown in FIG. 20, only one of the pair of terminal connections 23a is extended at an incline and is then folded back.

In the case of an intake manifold M, which is a main component of the engine air-intake system, a high degree of basic properties, such as strength, vibration resistance, and air-tightness, is required for the specifications of the final product. It may thus be seen that the diameter and shape of the electric resistance wire 20 used to join the surge tank Mt and outlet pipes Ma through Md have a considerable effect on the level of strength and air-tightness of the joined portion between the two.

Tests to determine the diameter of the electric resistance wire 20 revealed that a wire diameter of 1.0 mm allowed heat to be generated more rapidly (than a greater wire diameter) even with current that was low to a certain extent in cases where the electric resistance wire 20 was made of the aforementioned iron-chromium alloy, with a pitch diameter of about 50 [mm], for example, but that a lower wire diameter resulted in a narrower welding surface area, making it difficult to obtain satisfactory strength and resulting in carbonization due to the decomposition of the resin during long periods of electrification with high current, so that neither the desired strength nor air-tightness could be obtained.

On the other hand, a wire diameter that is too great, such as a diameter greater than 2.5 [mm], results in low resistance, so that a longer time is needed to generate heat, even with high currents, which is impractical, and it is also difficult to consistently heat the surrounding resin to a suitable temperature.

In view of the foregoing, it may be seen that the best results are obtained when the electric resistance wire 20 is set to a suitable diameter of between 1.5 and 2.5 [mm], and preferably 2.0 [mm].

The conductor resistance (Re) [Ω/m] of the electric resistance wire 20 can be calculated using the following formula.

$$Re = \rho / A \quad (1)$$

Here, $\rho$ is the inherent volume resistivity [$\mu\Omega$m] ($\mu=10^{-6}$) of the material of the electric resistance wire, and A is the lateral cross section area [m$^2$] of the electric resistance wire.

The range of the volume resistivity $\rho$ of the type of steel that is preferred as the material for the aforementioned electric resistance wire (such as nickel-chromium alloys, iron-nickel alloys, and iron-chromium alloys (types 1 and 2)) is between 1.01 (nickel-chromium alloy) to 1.42 (iron-chromium alloy (type 1)). These values can be substituted into the aforementioned Formula (1) to obtain the preferred range for volume resistivity $\rho$, which is $\rho=0.32$ to 0.45 [Ω/m].

In light of the above, the electric resistance wire 20 is preferably to have a diameter of 1.5 to 2.5 [mm] and a conductor resistance of 0.32 to 0.45 [Ω/m]. Iron-chromium alloy (type 1) is particularly preferred in terms of cost.

The method for joining the upstream end of the outlet pipe Mb to the surge tank Mt is described in detail below.

The surge tank Mt is supported vertically opposite that shown in FIG. 1, for example, so that the bottom faces upward. The aforementioned electric resistance wire 20 is first mounted on the junction. At this time, as shown in FIG. 21, the bottom of the outside diameter of the electric resistance wire 20 is guided by the aforementioned resistance wire positioning ribs 6, and the aforementioned electric resistance wire 20 is mounted in such a way as to be accurately positioned. In this embodiment, the pitch diameter of the electric resistance wire 20 is about 50 [mm], and the wire diameter is 2 [mm].

Figure 24:
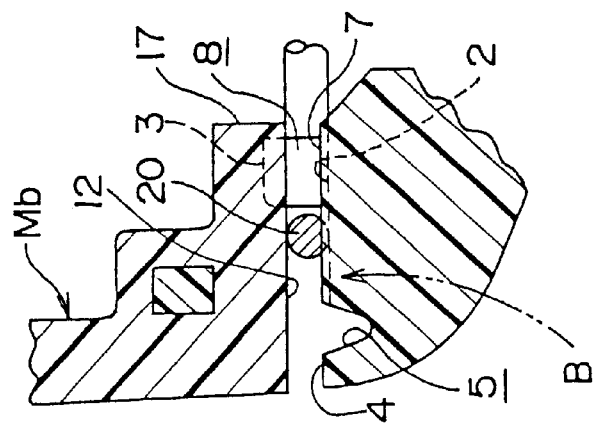
FIG. 24 is a vertical cross section of the set state of an outlet pipe and the surge tank of the intake manifold at junction B (part shown in cross section by line Yb—Yb in FIG. 16)
Figure 27:
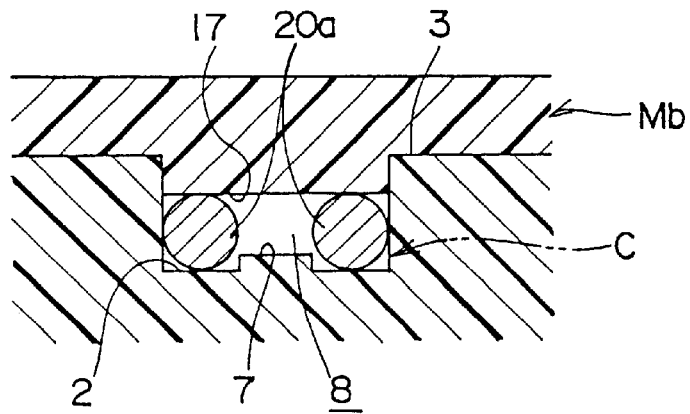
FIG. 27 is a vertical cross section of the set state of an outlet pipe and the surge tank of the intake manifold at junction C (part shown in cross section by line Yc—Yc in FIG. 16)

Also at this time, as shown in FIGS. 24, 27, and 30, the pair of terminal connections 20a of the electric resistance wire 20 protrude out from the recessed portion 8 provided in the aforementioned pipe positioning rib 3, and the joining supplementary resin rib 7 is positioned circumferentially so as to be located between the two terminal connections 20a.

After the electric resistance wire 20 has thus been mounted, the upstream end of the outlet pipe Mb is attached in such a way that the joining surface 12 faces the joining surface 2 on the surge tank Mt side, with the aforementioned electric resistance wire 20 sandwiched therebetween. At this time, the protrusion 17 of the outlet pipe Mb is positioned along the circumference of the outlet pipe Mb so as to be fitted to the aforementioned recessed portion 8 on the surge tank Mt side.

The two terminal connections 20a of the electric resistance wire 20 are connected to a predetermined electrification device (not shown in figure) having a power supply. A pressurization device (not shown in figure) is set up, which presses the upstream end of the outlet pipe Mb downward from behind (that is, toward the serge tank Mt side) at a desired pressure. The pressurization device is preferably one that can variably control pressure as set.

The set up step is completed by means of the above (see FIGS. 21, 24, 27, and 30).

Then, with the electric resistance wire 20 sandwiched between the two aforementioned surfaces 2 and 12 that are to be joined, the aforementioned pressurization device (not shown in figure) is operated to apply a first predetermined pressure between the two joining surfaces 2 and 12. During or after the pressure is started, the aforementioned electrification device (not shown in figure) is operated to apply a current of a predetermined level for a predetermined time to the electric resistance wire 20. The first step is thus completed.

Figure 25:
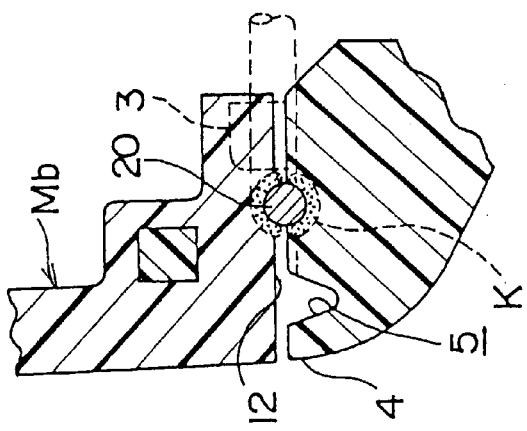
FIG. 25 is a vertical cross section of the state at Junction B at the end of the first step.
Figure 26:
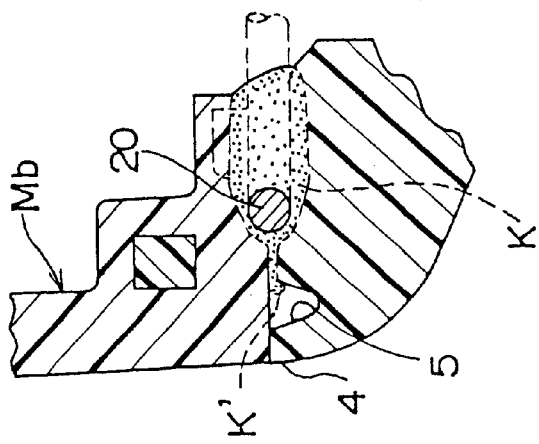
FIG. 26 is a vertical cross section of the state at Junction B at the end of the second step.
Figure 28:
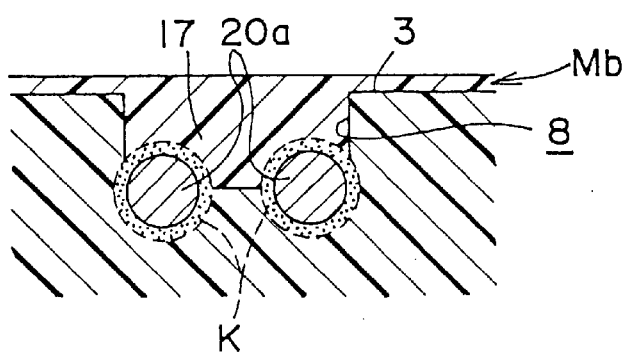
FIG. 28 is a vertical cross section of the state at Junction C at the end of the first step.

As a result of this first step, the resin around the electric resistance wire 20 is melted (melt resin: K) by the thermal energy produced in the electric resistance wire 20, as shown in FIGS. 22, 25, and 28. The pressure conditions (first predetermined pressure) and electrification conditions are set so that the surfaces 2 and 12 that are to be joined can be held a certain distance apart from each other (preferably a distance of about 35 to 65% of the diameter of the electric resistance wire 20) at this time, without the joining surface 12 of the outlet pipe Mb touching the aforementioned stopper 4 on the surge tank Mt side, during the electrification.

In this first step, in which the first predetermined pressure is applied and the current of the predetermined level is applied for a predetermined time to the aforementioned electric resistance wire 20, the resin around the electric resistance wire 20 is melted by the thermal energy produced in the electric resistance wire 20 while the joining surfaces 2 and 12 of the two aforementioned molded products are held at a predetermined distance, thus allowing a satisfactory molten state to be achieved by ensuring that the thermal energy reaches the resin around the electric resistance wire 20 without causing exorbitant increases in the temperature of the electric resistance wire 20 (that is, without causing the resin to decompose or producing unwanted gas).

Upon the conclusion of the first step, the aforementioned electrification device (not shown in figure) is turned off to stop the current to the electric resistance wire 20, and a second predetermined pressure is applied by means of the pressurization device (not shown in figure) as or after the electrification is stopped. The pressure is maintained until the joining surface 12 on the outlet pipe Mb is in contact with the aforementioned stopper 4 on the surge tank Mt side (that is, until the position of final pressure), and the joining surface 12 on the outlet pipe Mb is joined under pressure to the joining surface 2 on the surge tank Mt side (see FIGS. 23, 26, 29, and 32).

The second step is completed as a result of the above.

At this time, the aforementioned second predetermined pressure should be applied as quickly as possible after the current to the electric resistance wire 20 has been terminated.

When excess molten resin K' is produced while the parts are joined under pressure, the excess molten resin K' flows into and is held by the annular resin trough 5 provided on outer periphery of the stopper 4 (that is, the inner periphery of the surface 2 to be joined) on the surge tank Mt side. This allows the excess molten resin K' to effectively be prevented from overflowing between the surfaces 2 and 12 that are to be joined, and from adversely affecting the results achieved in joining the surfaces.

The resin in the parts that are joined can be bonded under pressure in a reliable manner because of the second step, in which, as noted above, the current to the aforementioned electric resistance wire 20 is stopped following the conclusion of the first step, and the second predetermined pressure is applied to join the molten resin under pressure.

That is, in this embodiment, the action of the pressure on the two joining surfaces 2 and 12 that are to be joined with each other is managed in two stages of pressure divided between the first and second steps, allowing the electric resistance wire 20 to be electrified and heated as the joining surfaces 2 and 12 are held at a predetermined distance from each other in the first step, while allowing these joining surfaces 2 and 12 to be pressed to their final joined position to ensure that the two molded products are joined under pressure in the second step. It is thus possible to suitably melt the resin in the joined portion to ensure that they are joined under pressure, and it is possible to provide the joined portion of the molded products with sufficiently higher bonding strength and air tightness than when the joining surfaces are joined under pressure to the final joined position in a one-stroke pressurization step (single stage pressurization) while the electric resistance wire is electrified and heated as in the past.

The method for joining the down steam ends of the outlet pipes Ma through Md to the port flange Mf formed in a unified manner with the upper half Mt1 of the surge tank Mt is described below using as a primary example a case in which the down stream end of the outlet pipe Mb is joined to the opening Hb1 of the port flange Mf.

Figure 33:
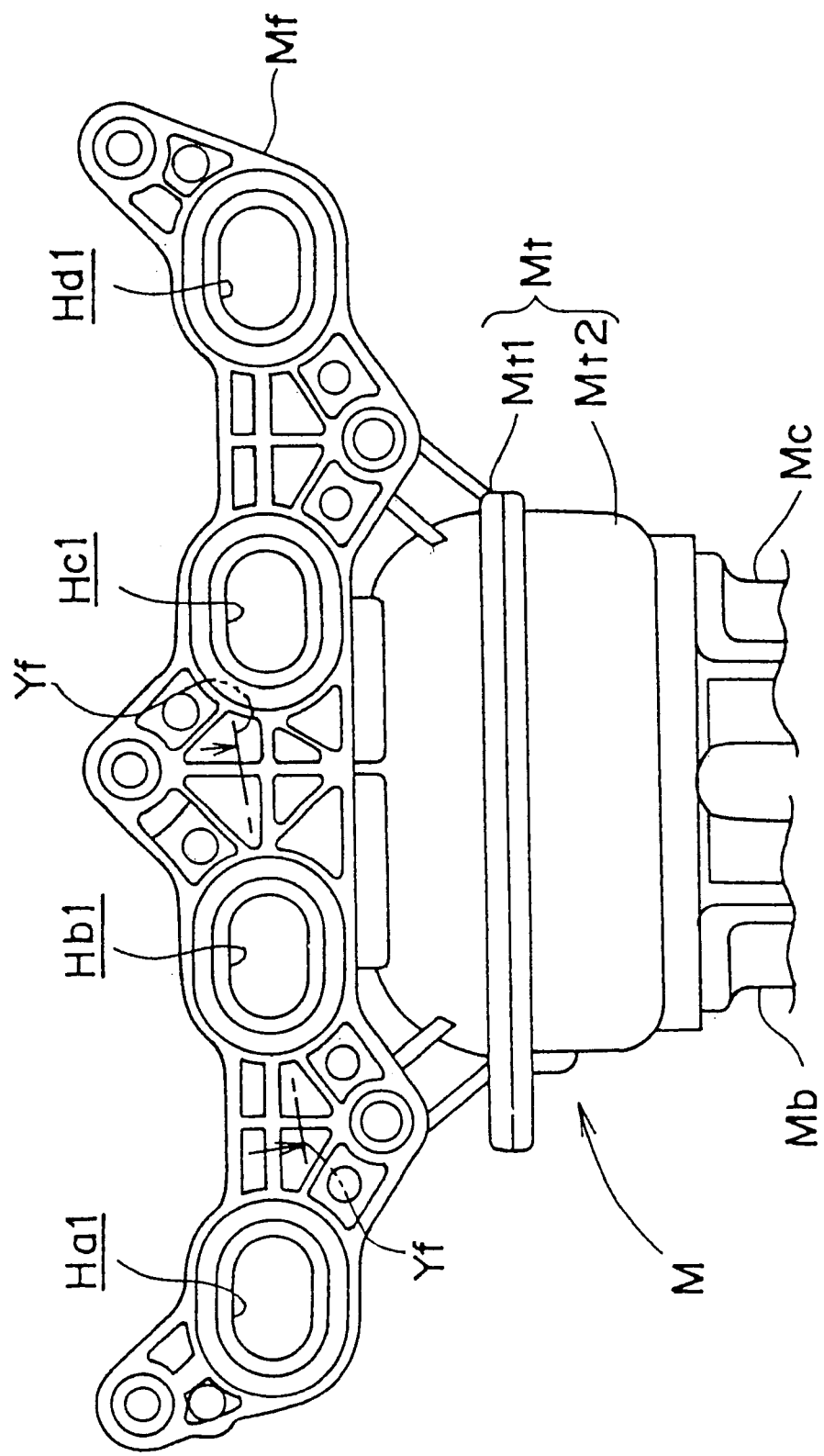
FIG. 33 is a front view of the surge tank viewed from the port flange side.
Figure 34:
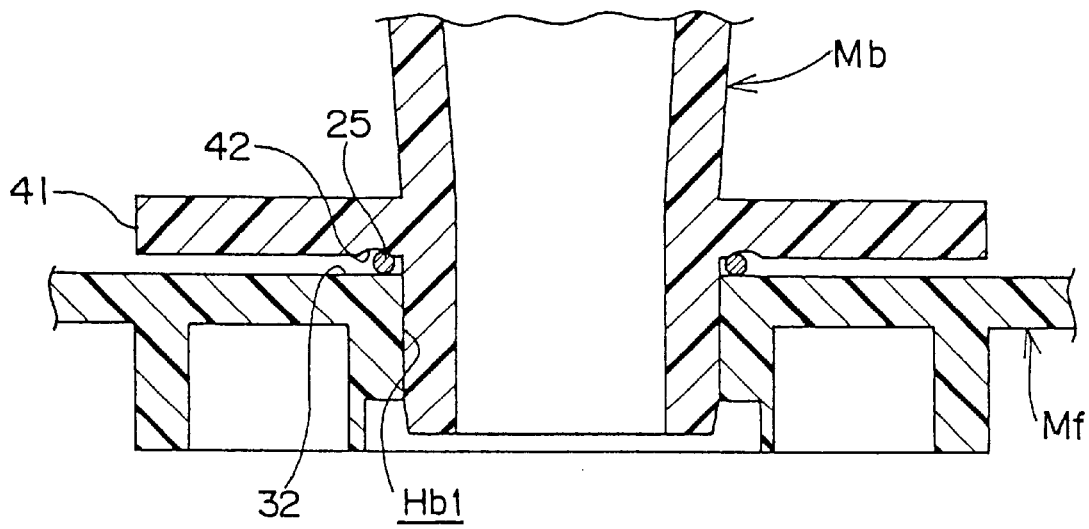
FIG. 34 is a vertical cross section of the set state of an outlet pipe and the port flange of the intake manifold at a junction (part shown in cross section by line Yf—Yf in FIG. 33)
Figure 35:
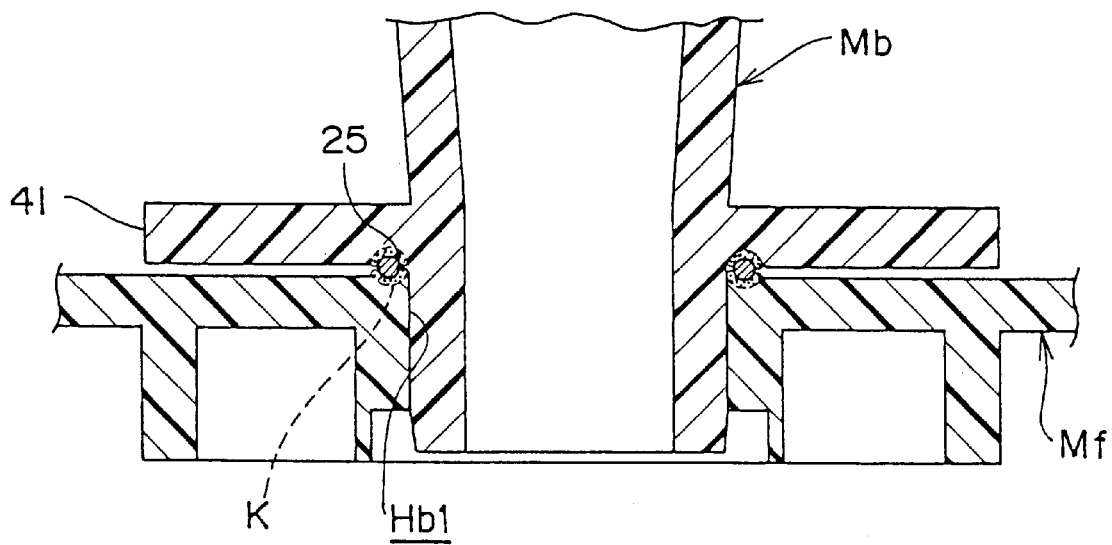
FIG. 35 is a vertical cross section of the state of the port flange and the outlet pipe at the junction following the conclusion of the first step.
Figure 36:
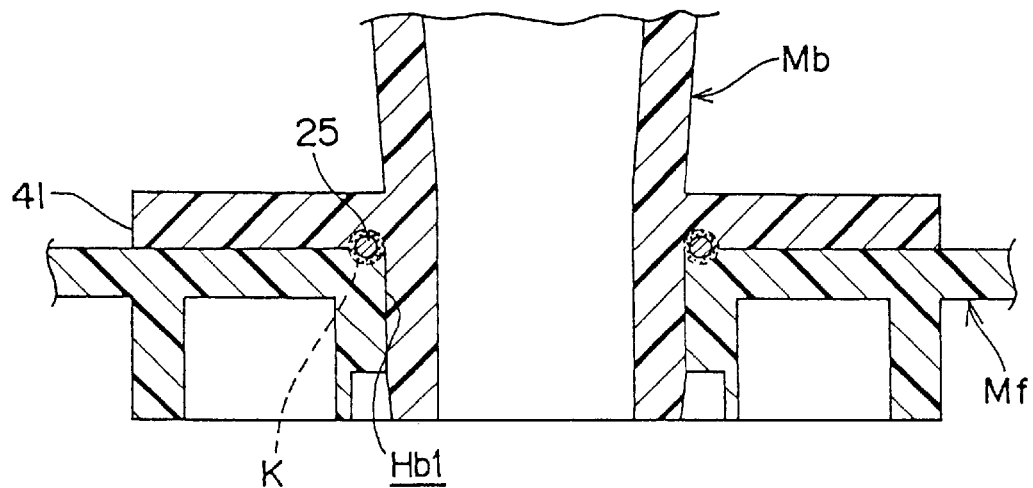
FIG. 36 is a vertical cross section of the state of the port flange and the outlet pipe at the junction following the conclusion of the second step.
Figure 37:
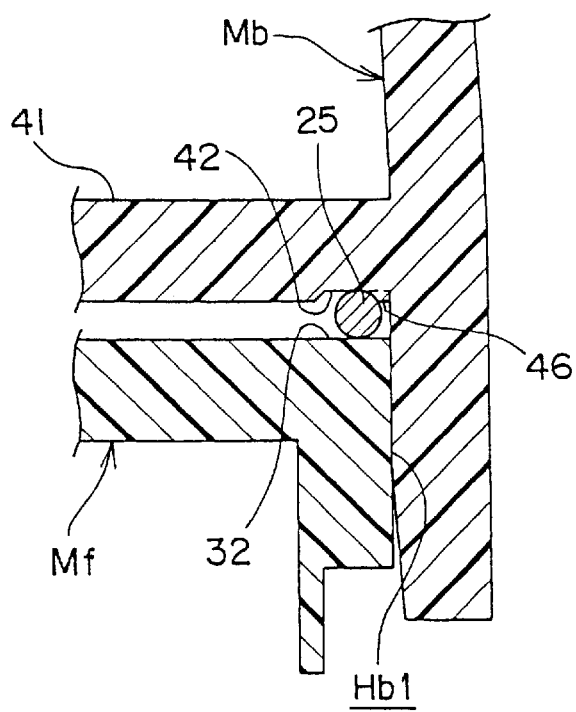
FIG. 37 is a vertical cross section showing an enlargement of the set state in the main components of the junction between the outlet pipe and the port flange of the intake manifold (part shown in cross section by line Yf—Yf in FIG. 33)
Figure 38:
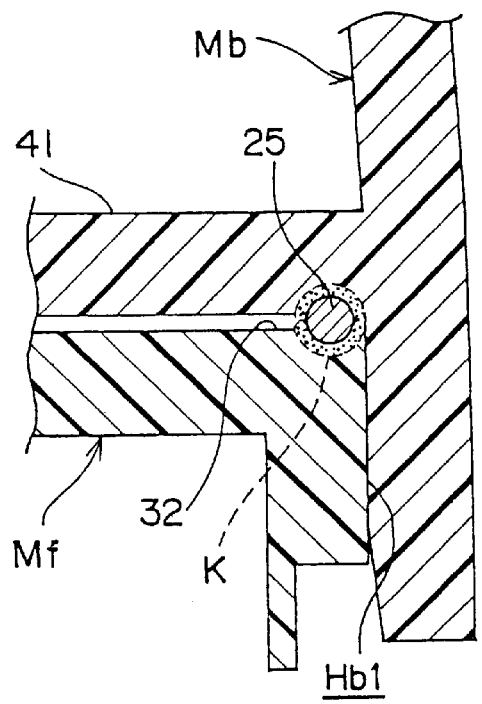
FIG. 38 is a vertical cross section showing an enlargement of the state in the main components of the junction between the outlet pipe and the port flange at the conclusion of the first step.
Figure 39:
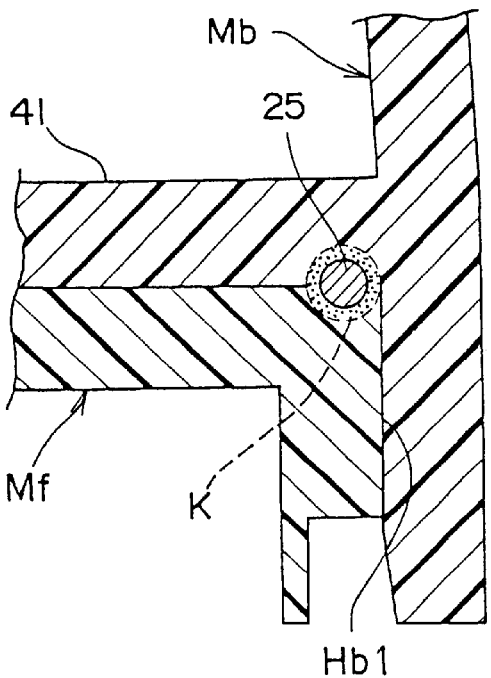
FIG. 39 is a vertical cross section showing an enlargement of the state in the main components of the junction between the outlet pipe and the port flange at the conclusion of the second step.

FIG. 33 is a front view of the intake manifold M from the port flange Mf side. The main parts of the outlet pipes Ma through Md are not illustrated in these figures. FIGS. 34 through 36 illustrate the steps for joining (melt joining under pressure) the outlet pipe Mb to the opening Hb1 of the manifold Mf at the junction (cross section Yf—Yf in FIG. 33), and FIGS. 37 through 39 are partial enlargements of the junction.

As shown in the figures, the joining surface 32 (peripheral portion in back of opening Hb1) where the port flange Mf is joined to the outlet pipes (represented here by outlet pipe Mb) is formed with a flat surface, and when the outlet pipe Mb is joined under pressure, the flange 41 of the outlet pipe Mb is restrained and thereby axially positioned. The tip of the down stream end of the outlet pipe Mb is also fitted to the opening Hb1, allowing radial shifts of the pipe axis to be controlled.

A plurality of protuberant electric resistance wire positioning ribs 46 for the radial positioning of the electric resistance wire 25 are evenly arranged, for example, in a circular pattern or the like in the connecting base of the flange 41 of the aforementioned outlet pipe Mb.

Although not specifically shown in the figures, a recessed portion, which is preferably stepped so as to form a surface in common with the surface 42 that is to be joined, is formed facing the terminal connections of the electric resistance wire 25 in a predetermined location around the aforementioned flange 41, and the recessed portion is provided with a joining supplementary resin rib to compensate for the amount of molten resin.

Meanwhile, on the port flange Mf side, a protrusion facing the terminal connections of the electric resistance wire 25 (that is, facing the recess formed on the outlet pipe Mb side) is provided in a predetermined location around the joining surface 32.

The down stream ends of the outlet pipes Ma through Md are fitted and joined to the openings Ha1 through Hd1 of the port flange Mf in such a way that the aforementioned protrusions (not shown in figure) of the outlet pipes Ma through Md are fitted to the recesses (not shown in figure) on the port flange Mf side.

The electric resistance wire 25 that is used when the down stream end of the aforementioned outlet pipe Mb is joined to the port flange Mf is not specifically illustrated, but it is formed in a generally longitudinal ring shape overall, corresponding more to the shape of the end of a pipe (that is, corresponding to the shape of the hole of the opening Hb1) rather than the flange 41, and is open only at the terminal connections.

Iron-chromium alloy (type 1) may be used, for example, as the material for the aforementioned electric resistance wire 25 in the same manner as in the case of the upstream end of the outlet pipe Mb. The electric resistance wire 25 should have a diameter of between 1.5 and 2.5 [mm], and preferably 2.0 [mm], for the same reasons as above.

The method for joining the down stream end of the outlet pipe Mb to the port flange Mf is described below. This joining method is essentially the same as that used to join the upstream end of the outlet pipe Mb to the surge tank Mt.

That is, the tip pipe section of the down stream end of the outlet pipe Mb is fitted to the opening Hb1 of the port flange Mf as the electric resistance wire 25 is precisely positioned while guided on the internal diameter side by the aforementioned electric resistance wire positioning ribs 46. The two joining surfaces 32 and 42 which are to be joined are thus facing each other, with the aforementioned electric resistance wire 25 sandwiched therebetween. The circumferential positioning of the outlet pipe Mb is the same as that on the upstream side.

The two terminal connections (not shown in figure) of the electric resistance wire 25 are connected to the predetermined electrification device (not shown in figure) which includes the power supply, as noted above. The same pressurization device (not shown) as that used to connect the upstream end is set up. The set up step is thus completed (see FIGS. 34 and 37).

The aforementioned pressurization device (not shown) is operated, while the electric resistance wire 25 is sandwiched between the two aforementioned surfaces 32 and 42 which are to be joined, and a first predetermined pressure is applied between these two joining surfaces 32 and 42. As or after the pressure is begun, the aforementioned electrification device (not shown) is operated to apply predetermined value of current for a predetermined time to the electric resistance wire 20. The first step is thus complete.

As a result, the resin around the electric resistance wire 25 is melted (melt resin: K) by the thermal energy produced in the electric resistance wire 25, as shown in FIGS. 35 and 38.

At this time, the pressure conditions (first predetermined pressure) and electrification conditions are set so that the surfaces 32 and 42 that are to be joined can be held a certain distance apart from each other (preferably a distance of about 35 to 65% of the diameter of the electric resistance wire 25), without the flange 41 of the outlet pipe Mb touching the back side of the port flange Mf, during electrification.

The same effects as those obtained in the case of the upstream side of the outlet pipe Mb (joined with the surge tank Mt) can thus be obtained in this case as well.

Upon the conclusion of the first step, the aforementioned electrification device (not shown in figure) is turned off to stop the current to the electric resistance wire 25, and a second predetermined pressure is applied by means of the pressurization device (not shown in figure) as or after the electrification is stopped. The pressure is maintained until the flange 41 of the outlet pipe Mb is in contact with the backside of the port flange Mf side (that is, until the position of final pressure), and the joining surface 42 on the outlet pipe Mb is joined under pressure to the joining surface 32 on the port flange Mf side (see FIGS. 36 and 39). The second step is thus completed.

That is, the same effects as those obtained in joining the upstream side (to the surge tank Mt) can also be obtained by two-stage pressurization to join the outlet pipe Mb to the down stream side, making it possible to suitably melt the resin in the joined portion to ensure that they are joined under pressure, and also making it possible to provide the joined portion of the molded products with sufficiently higher bonding strength and air tightness than when the joining surfaces are joined under pressure to the final joined position in a one-stroke pressurization step (single stage pressurization) while the electric resistance wire is electrified and heated as in the past.

Figure 40:
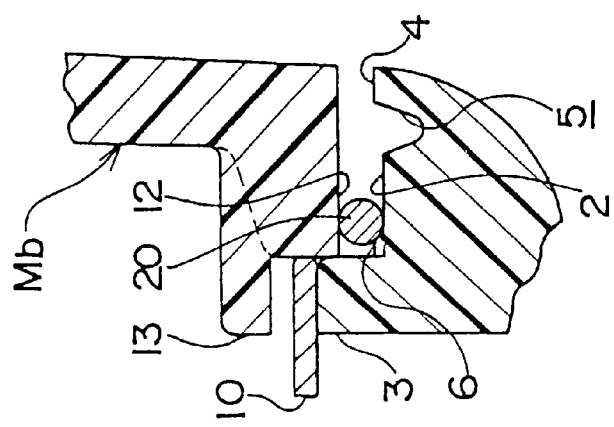
FIG. 40 is a vertical cross section of the set state in the junction between the outlet pipe and the surge tank of the intake manifold in a second embodiment of the present invention.
Figure 41:
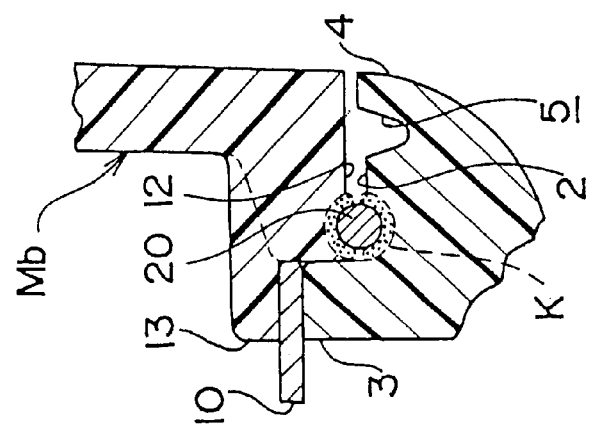
FIG. 41 is a vertical cross section of the state of the junction following the conclusion of the first step in the second embodiment.
Figure 42:
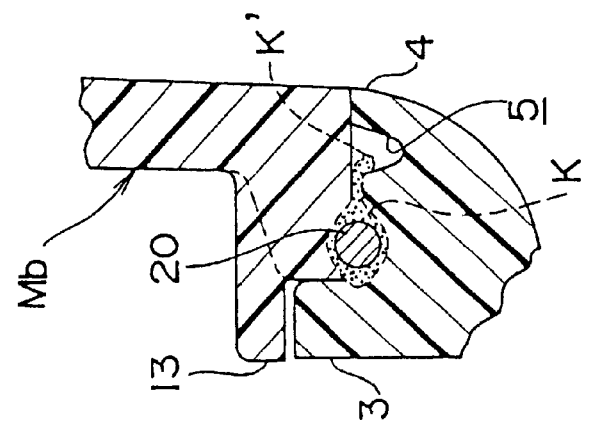
FIG. 42 is a vertical cross section of the state of the junction following the conclusion of the second step in the second embodiment.

FIGS. 40 to 42 depict a second embodiment of the method in the present invention. In the following description, the same symbols are used for parts and actions that are the same as those in the embodiment described in FIGS. 1 through 39 (hereinafter referred to as the first embodiment), and will not be further elaborated.

FIGS. 40 to 42 correspond to FIGS. 21 through 23 of the first embodiment, and illustrate an example of a case in which the upstream end of the outlet pipe Mb is joined to the surge tank Mt.

This second embodiment is provided with gapping means for holding at a predetermined interval the joining surfaces 2 and 12 of the two aforementioned molded products Mb and Mt in only the first step of the joining process.

That is, an outwardly extending rim 13 is formed, above the surface 12 to be joined, at the upstream end of the outlet pipe Mb. The rim 13 is preferably formed generally in the shape of a ring except for where the protrusion 17 is located, and faces the pipe positioning rib 3 on the surge tank Mt side when the outlet pipe Mb is fitted to the surge tank Mt. The aforementioned rim 13 need not necessarily be in the form of a ring, and a plurality may be evenly arranged in a circular pattern.

A spacer 10 of a predetermined thickness is arranged on the upper surface of the pipe positioning rib 3 on the surge tank Mt side in the first step (see FIG. 40). The spacer 10 is preferably a structure divided in two, which is formed in a generally annular shape overall when assembled, except for the portion corresponding to the recessed portion 8 of the pipe positioning rib 3.

In this state, the first predetermined pressure is applied between the surfaces 2 and 12 that are to be joined, and current of a predetermined value is applied for a predetermined time to the electric resistance wire 20. As a consequence, the resin around the electric resistance wire melts, and the outlet pipe Mb drops down, resulting in a narrow interval between the upper surface of the pipe positioning rib 3 and the bottom surface of the rim 13, but the aforementioned spacer 10 is interposed between the two, and the dropping action of the outlet pipe Mb stops precisely when the rim 13 touches the spacer 10 (see FIG. 41). In this state, the thickness of the spacer 10 is set to allow the joining surfaces 2 and 12 to be held a certain distance apart from each other (preferably a distance of about 35 to 65% of the diameter of the electric resistance wire 20).

Upon completion of the aforementioned first step, the aforementioned spacer 10 is removed from between the rim 13 and the pipe positioning rib 3. Since the spacer 10 is divided in two, it can be readily removed from between the rim 13 and pipe positioning rib 3.

The second step is then carried out, and the outlet tube Mb is pressed until the joining surface 12 touches the stopper 4 of the surge tank Mt (see FIG. 42).

The same effects as in the first embodiment described above can essentially be obtained in the second embodiment as described above, and since, moreover, gapping means to hold the joining surfaces 2 and 12 of the two aforementioned molded products apart a certain distance is provided only in the aforementioned step, the aforementioned surfaces that are to be joined can be kept apart at precisely a certain distance in the first step.

The aforementioned gapping means is specifically the spacer 10 of a predetermined thickness. The spacer 10 is interposed between the two molded products in the aforementioned first step and is removed from therebetween in the aforementioned second step, allowing the aforementioned joining surfaces 2 and 12 to be kept apart at precisely a certain distance in the first step.

Figure 43:
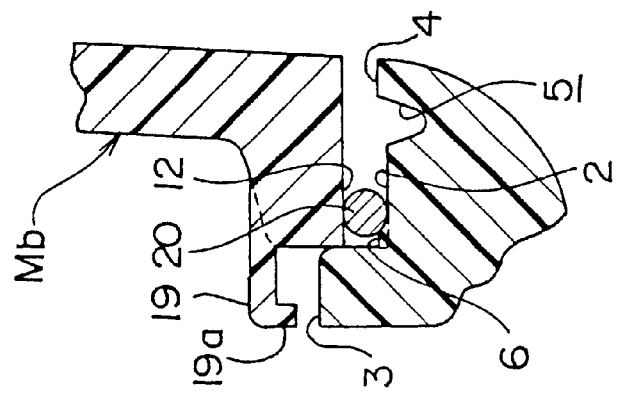
FIG. 43 is a vertical cross section of the set state in the junction between the outlet pipe and the surge tank of the intake manifold in a third embodiment of the present invention.
Figure 44:
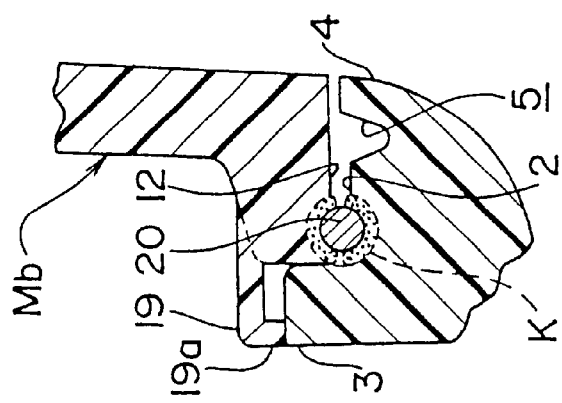
FIG. 44 is a vertical cross section of the state of the junction following the conclusion of the first step in the third embodiment.
Figure 45:
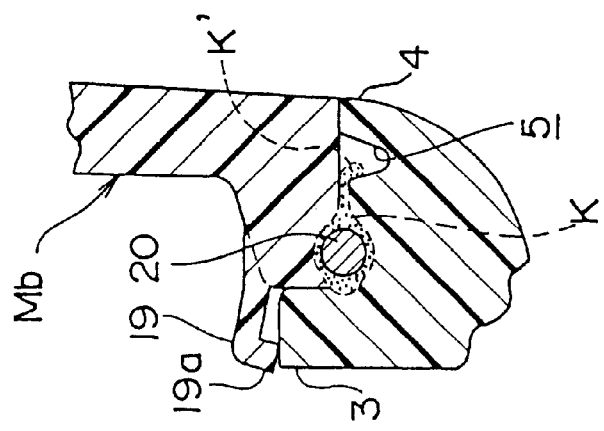
FIG. 45 is a vertical cross section of the state of the junction following the conclusion of the second step in the third embodiment.

FIGS. 43 through 45 depict a third embodiment of the method in the present invention. These FIGS. 43 through 45 correspond to FIGS. 21 through 23 in the first embodiment and FIGS. 40 through 42 in the second embodiment, and depict an example of a case in which the upstream end of the outlet pipe Mb is joined to the surge tank Mt.

In the third embodiment, gapping means for holding the joining surfaces 2 and 12 of the two aforementioned molded products Mb and Mt apart a certain distance only in the first step of the joining is unified with at least one of the two molded products Mb and Mt (the outlet pipe Mb side in the present embodiment).

That is, an outwardly extending extension 19 having a predetermined bending rigidity is formed in a unified manner with the outlet pipe Mb above the joining surface 12 on the upstream end of the outlet pipe Mb. The extension 19 is preferably formed generally in the shape of a ring with the exception of where the protrusion 17 is located, and faces the pipe positioning rib 3 on the surge tank Mt side when the outlet pipe Mb is attached to the surge tank Mt. The aforementioned extension 19 is not necessarily in the shape of a ring, and a plurality may be evenly arranged in a circular pattern.

After the electric resistance wire 20 has been mounted in the surge tank Mt side, and the outlet pipe Mb has been set up so that the joining surfaces 2 and 12 are facing each other with the electric resistance wire 20 interposed therebetween (see FIG. 43), the first predetermined pressure is applied to the surfaces 2 and 12 which are to be joined, and current of a predetermined level is applied for a predetermined time to the electric resistance wire 20 in the first step. As a consequence, the resin around the electric resistance wire melts, and the outlet pipe Mb drops down, but when it drops down a certain distance, the tip 19a of the extension 19 protrudes against the upper surface of the pipe positioning rib 3, stopping the outlet pipe Mb from dropping down any further (see FIG. 44).

The first predetermined pressure and the vertical position, bend rigidity, and the like of the extension 19 are set so that the two joining surfaces 2 and 12 are held apart a certain distance (preferably a distance of about 35 to 65% of the diameter of the electric resistance wire 20) in this state.

The second step is carried out upon the conclusion of the aforementioned first step, the current to the electric resistance wire is terminated, and the second predetermined pressure is applied between the surfaces 2 and 12 which are to be joined. As a consequence, the aforementioned extension becomes deformed or bent, allowing the outlet pipe Mb to drop down, which results in a narrower space between the two surfaces 2 and 12 which are to be joined.

The outlet pipe Mb is joined under pressure to the final joined position at which the joining surface 12 touches the stopper 4 of the surge tank Mt (see FIG. 45).

As described above, essentially the same effects as those obtained in the first embodiment can also be obtained in the third embodiment, and a gapping means is also provided for holding apart at a certain distance the joining surfaces 2 and 12 of the two aforementioned molded products only in the first step in the same manner as in the second embodiment, making it possible to ensure that the aforementioned joining surfaces are held apart a certain distance in the first step.

The aforementioned gapping means is the extension 19 which is essentially formed in a unified manner with at least one of the two aforementioned molded products, and this extension 19 is deformed by the action of the second predetermined pressure in the aforementioned second step, so that the space between the joining surfaces of the two aforementioned molded products is narrowed, making it unnecessary to provide a gapping means that is separate from the molded product, and also eliminating the trouble of removing the gapping means after the first step has been completed.

In the method for joining the thermoplastic resin molded products described above, preferred values or ranges have been established for the shapes and dimensions of the electric resistance wire, the electrification conditions, and the pressurization conditions for the first and second steps, and various tests were conducted on the effects these values had on the results of joining.

The basic standards for evaluating the joined parts in these tests were that a welding strength of at least 2.4 [kgf/mm] could be maintained and that no leakage resulted when 1.0 [kgf/cm$^2$] air pressure is applied as internal pressure. The tests are described below.

Figure 46:
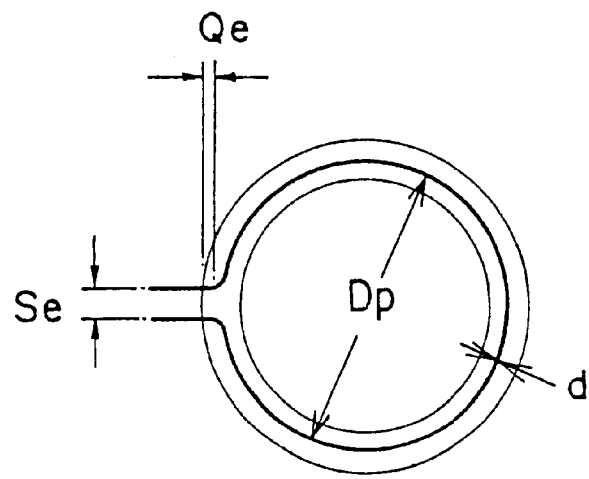
FIG. 46 is a plan showing a model of the shape and dimensions of the electric resistance wire and the state in which it was set up in the junction in various tests of the method in the present invention.
Figure 47:
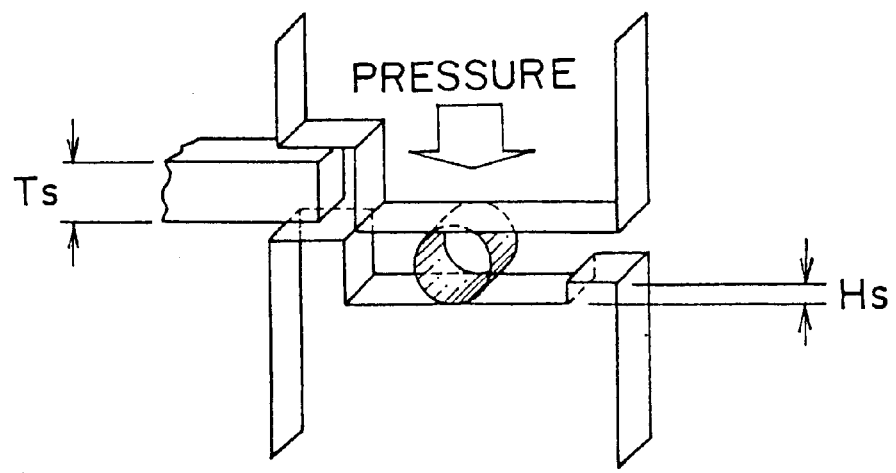
FIG. 47 is an illustration showing a model of the state of the pressure in the junction in various tests of the method in the present invention.

FIG. 46 is an illustration showing a model of the shape and dimensions of the electric resistance wire and the state in which it was set up in the junction when these tests were carried out. FIG. 47 is an illustration showing a model of the shape of the junction, the pressurization conditions, and the like.

In these tests, the shape of the heat generation component of the electric resistance wire was round, the pitch diameter Dp was 49 [mm], and the wire diameter d was 2 [mm]. The shape and pitch diameter of the heat generating component of the aforementioned electric resistance wire corresponded to the joined portion on the upstream side of the outlet pipe Mb in the aforementioned embodiments. The wire diameter was set to 2 [mm] for the reasons given above.

The welding strength of the junctions was evaluated by cutting the junction to a length of 10 [mm] along the electric resistance wire to prepare a test sample, and then using the test sample in pulling tests. The tensile strength per unit length [mm] was calculated as the welding strength of the junction.

The welding strength was evaluated in pulling tests using 5 samples per tested item (number of samples: 5), and the mean value was calculated as the welding strength per test item.

Figure 49:
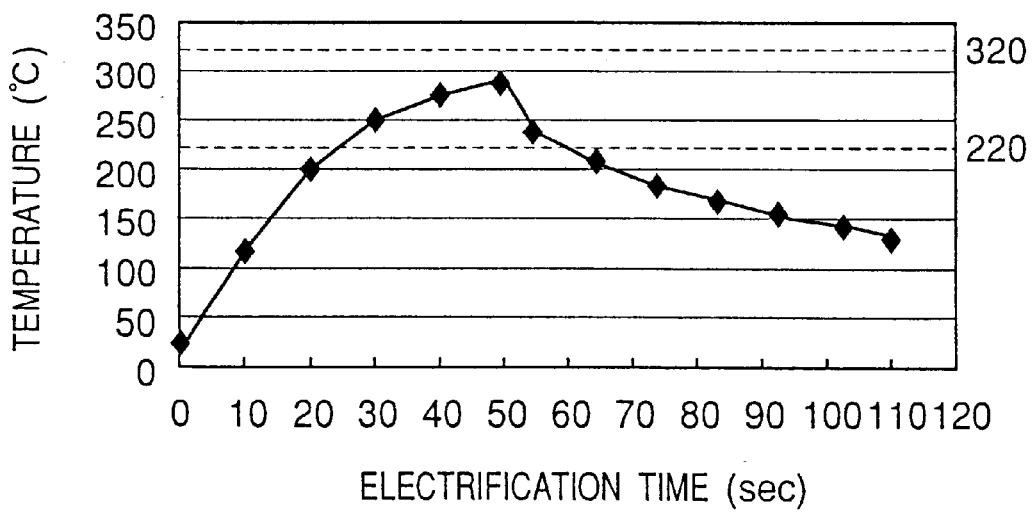
FIG. 49 is a graph showing the relationship between the temperature of the electric resistance wire and the time for which current is applied to the electric resistance wire in the first step.

FIG. 49 is a graph showing the relationship between the electrification time and the temperature of the electric resistance wire when 30 [A(ampere)] current was applied to the electric resistance wire (iron-chromium alloy: diameter of 2.0 [mm]) in this embodiment.

The current value and electrification time are related as conditions (that is, the temperature of the electric resistance wire) for generating thermal energy to melt the resin around the electric resistance wire. In this case, thermal energy must be generated between a temperature at which the resin melts (about 220° C. in this embodiment (with a polyamide resin containing 30% reinforcing glass fiber)) and a temperature at which the resin decomposes (about 320° C. in this embodiment).

It may be seen that higher welding strength is obtained when the resin is heated to a temperature as close as possible to the temperature at which the resin decomposes. However, when the set current value is increased, the resin melting point is rapidly reached by means of quick thermal generation, allowing the resin to be melted more rapidly, but the resin decomposition temperature is reached immediately, and the temperature is difficult to regulate or control.

Conversely, when the set current is lowered, it takes too long to reach the resin melting point, resulting in poor efficiency. Furthermore, when current is applied for a long time to produce heat in order to melt the resin, the joined surfaces as a whole soften and become deformed, resulting in a deformed product.

Tests which were conducted by varying the electrification time and the current value of the electric resistance wire to study the molten state of the surrounding resin revealed that a satisfactory molten state could not be obtained even with 120 seconds of electrification at a current value of less than 25 [A]. A current value greater than 35 [A], on the other hand, failed to provide satisfactory bonding strength because the resin around the resistance wire tended to be carbonized, even with a considerably shorter electrification time of between 20 and 25 seconds.

By contrast, a current value of 30 [A] resulted in a good molten state and in satisfactory joining strength at an electrification time of between 45 and 55 seconds. In this case, the best result was obtained at an electrification time of 50 seconds.

Figure 48:
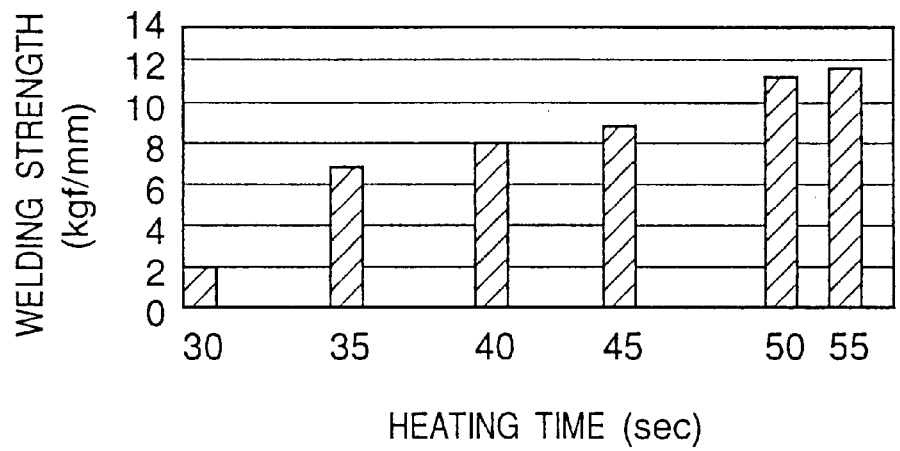
FIG. 48 is a graph showing the relationship between the heating time in the first step and the welding strength of the junction.

FIG. 48 is a graph showing the relationship between the heating time in the first step (that is, the time for which current is applied to the electric resistance wire) and the welding strength of the junction. The test indicated by the graph was conducted at a current value of 30 [A] and a pressure of 236 [kgf] in two stages of compression in the first and second steps.

The graph in FIG. 48 shows that the necessary welding strength could not be obtained with 30 seconds of electrification at a current value of 30 [A], and that there were no considerable differences in the welding strength obtained at an electrification time of between 50 and 55 seconds.

In view of the foregoing, the following range of numerical values is suitable for the electrification conditions involved in melting the resin.

Current=25 to 35 [A(ampere)]

Electrification time=45 to 55 [seconds]

A current of 30 [ampere] and an electrification time of 50 [seconds] are ideal conditions. These electrification conditions were used in the aforementioned embodiments above.

Figure 50:
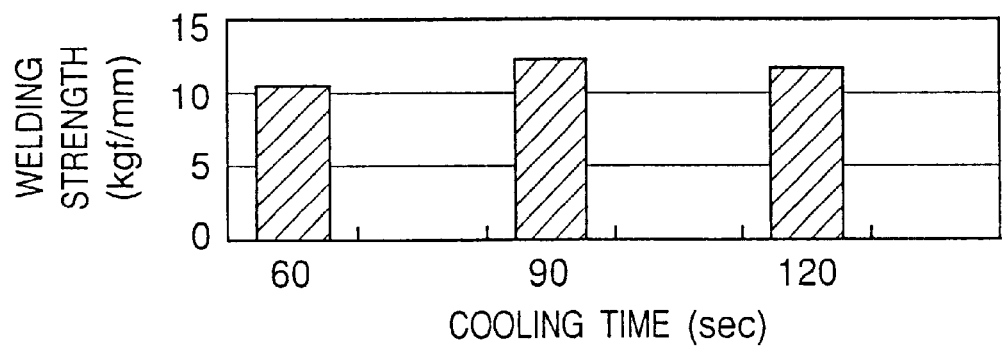
FIG. 50 is a graph showing the relationship between the cooling time and the welding strength of the junction.

FIG. 50 is a graph showing the relationship between joining strength and the time until pressure was released after being applied in the second step following the termination of current to the electric resistance wire in the first step (hereinafter referred to as cooling time) The test indicated by the graph was conducted at a current value of 30 [A] for an electrification time of 50 seconds and a pressure of 236 [kgf] in two stages of compression in the first and second steps.

The results of the test revealed no significant differences in bonding strength even when the cooling time was changed from 60 seconds to 120 seconds. The pressure retention time was set to 60 seconds in the aforementioned embodiments to shorten the processing time.

Figure 51:
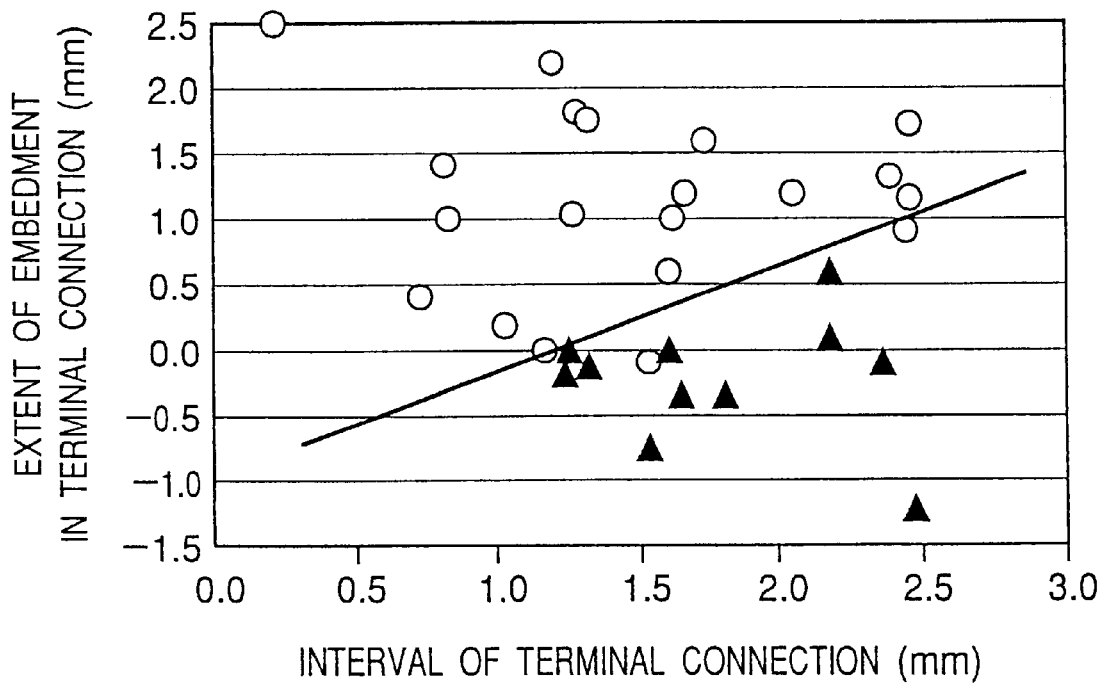
FIG. 51 is a graph showing the effects which the dimensions and shape of the terminal connections of the electric resistance wire and its set up in the junction had on the sealing properties of the junction.

FIG. 51 is a graph showing the effects which the dimensions and shape of the terminal connections of the electric resistance wire and the set up of the electric resistance wire in the junction had on the sealing properties of the junction.

The test indicated in the graph was conducted at a current value of 30 [A] for an electrification time of 50 seconds and a cooling time of 60 seconds, and at a pressure of 236 [kgf] in two stages of pressurization in the first and second steps. In this test, a pair of cap-shaped molded products were joined together by the joining method in the embodiments to check for air leakage at the junction when 1 [kgf] air pressure was applied to the interior of the hollow.

Sealing problems particularly in the joining portions between the molded products tend to occur in the terminal connections where end portions of the electric resistance wire run parallel with each other. This is because the resin temperature in the terminal connections where the end portions of the electric resistance wire is set in parallel with each other tends to increase more readily than in other parts, and gas tends to be produced when the resin melts. This gas (bubbling) is entrained when the parts are joined under pressure, adversely affecting the sealing properties of the junction.

Although widening the interval of the terminal connections has been considered, the resin sometimes cannot be sufficiently melted, and is extremely difficult to regulate or control. The molten state is inherently difficult to control particularly in conventional one-stroke pressurization (single stage pressurization) methods, resulting in especially pronounced problems, which prevent consistent results from being obtained.

In this test, therefore, the sealing properties of the junction were investigated by changing the interval Se of the terminal connection (see FIG. 46) within the range of about 0.2 and 2.5 [mm] and the extent of the embedment Qe in the terminal connection within the range of about −1.2 to 2.5 [mm], in order to determine the optimum conditions for the opening in which the terminal connection of the electric resistance wire is formed.

The extent of embedment Qe in the terminal connection indicates the distance from the root of the curved R portion in the terminal connection to the outer periphery of the molded product (in other words, the length of the linear portion in the embedded portion of the terminal connection). A negative (−) value for the extent of embedment Qe is when the electric resistance wire is irregularly set in the junction, causing the curved R portion to bulge outward.

The graph in FIG. 51 shows that good sealing properties with no leakage could be ensured when the extent of embedment Qe in the terminal connection was greater than 1.0 [mm] and the interval Se of the terminal connection was within the range of 1.0 to 2.5 [mm].

In the embodiment, the extent of embedment Qe in the terminal connection was set to be greater than 1.0 [mm], and the interval Se of the terminal connection was set to be 2.0 [mm].

In the embodiment, the electric resistance wire positioning ribs (indicated by 6 in the first embodiment) were provided at the joining surface to ensure that the electric resistance wire was properly positioned, so the above mentioned conditions could be achieved relatively easily as long as the molding precision of the electric resistance wire was suitably maintained.

When the electric resistance wire is mounted on the surfaces that are to be joined, it is precisely positioned by the aforementioned positioning ribs, so that a slight gap (about 0.5 to 1.0 [mm], for example) is preferably provided between the outer periphery of the electric resistance wire and the vertical wall (in the first embodiment, inner peripheral wall surface of pipe positioning ribs) of the outer peripheral portion of the surface that is to be joined.

The gap thus provided on the outer periphery of the electric resistance wire can more easily ensure more effective bonding strength based on the molten resin and can afford higher bonding strength in terms of the surfaces that are to be joined in this part as well. Such a gap is unnecessary, of course, in cases where no particularly high strength is required.

Figure 52:
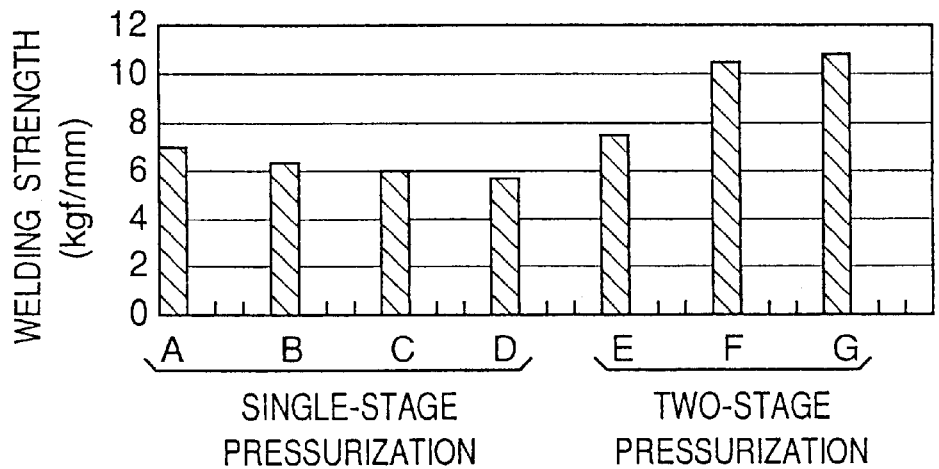
FIG. 52 is a graph comparing the welding strength of junctions in single-stage and two-stage pressurization.

FIG. 52 is a graph showing a comparison of the welding strength of junctions in single-stage pressurization and two-stage pressurization.

Bar graphs A through D indicate differing pressures [kgf] in single-stage pressurization (A: 39; B: 78; C: 156; and D: 236 [kgf]).

Bar graphs E through G indicate differing spacer thicknesses Ts [mm] (see FIG. 47) in two-stage pressurization (E: 0.5; F: 0.8; and G: 1.3 [mm]). This joining in two stages of pressurization was carried out at a current value of 30 [A] for an electrification time of 50 seconds and a cooling time of 60 seconds, and at a pressure of 236 [kgf] in the two stages of pressurization in the first and second steps.

The graph in FIG. 52 shows that the pressurization in two stages allows the welding strength of the junction to be increased more than in conventional single stage pressurization (one-stroke pressurization), regardless of the set value of the spacer thickness Ts.

It may also be seen that a higher welding strength is obtained the higher the spacer thickness Ts.

Figure 53:
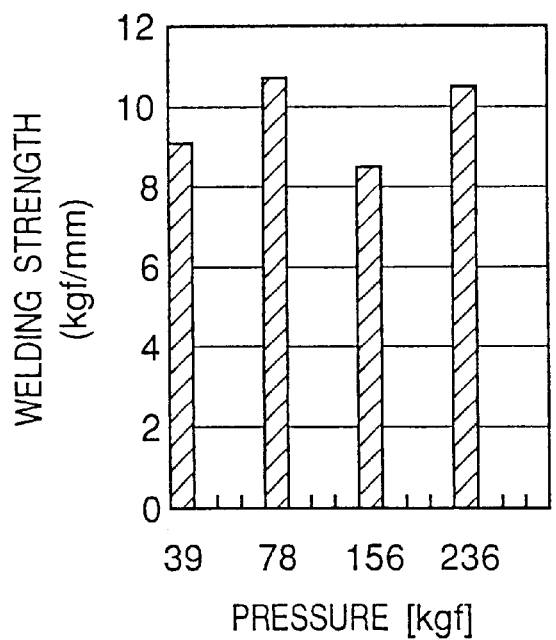
FIG. 53 is a graph showing the relationship between the welding strength of the junction and the pressure in two-stage pressurization.

FIG. 53 is a graph showing the relationship between the pressure in the two stage pressurization and the welding strength of the junction. In the test indicated in the graph, the first pressure (first step) and the second pressure (second step) were the same.

The graph reveals that two stage pressurization allowed the target welding strength (2.4 [kgf/mm]) to be obtained even with low pressure. The pressure was 236 [kgf] in the aforementioned embodiments.

Figure 54:
FIG. 54 is a graph showing the relationship between the height of the stopper and the welding strength of the junction.

FIG. 54 is a graph showing the relationship between the welding strength of the junction and the height Hs [mm] of the stopper (see FIG. 47) controlling the pressure bonding location (final pressure bonding location) in the second step when parts are joined by two stage pressurization.

The graph reveals that higher welding strength is obtained in the junction the lower the height Hs of the stopper provided in the junction. The stopper height Hs was 0.4 [mm] in the aforementioned embodiments.

In the aforementioned embodiments, the method of the present invention was applied to join outlet pipes Mb and Mc, and Ma and Md, to the surge tank Mt in the manufacture of a synthetic resin intake manifold, but the present invention is not limited to such manufacturing methods, and can also be effectively applied to join together various other molded products made of thermoplastic resins.

The present invention is not limited to the combination of a surge tank and outlet pipes, and it can be applied to, for example, the cases in which at least one of two molded products has a hole in at least the surface that is to be joined, and the other molded product is equipped with an annular junction that is fitted to the aforementioned hole.

In this case, an electric resistance wire having a ring-shaped heat generating portion is used to join the two molded products together in a relatively easy and reliable manner.

One of two molded products may also be a hollow element having an opening in at least the surface that is to be joined, and the other molded product may be a tubular element having a connecting portion that is fitted to the aforementioned opening. In this case, the junction can be provided with satisfactorily high bonding strength and airtightness when the hollow element and tubular element are joined.

It need hardly be mentioned that the present invention is not limited to the above embodiments, and is capable of various improvements and modification in design within the scope of the invention.

What is claimed is:

1. A method for joining thermoplastic resin molded products together by pressing together joining surfaces of two molded products that are to be joined, with electric resistance wire therebetween, when such thermoplastic resin molded products are to be joined together, and by applying current to heat the electric resistance wire, so that resin around the electric resistance wire is melted and bonded under pressure to join the two molded products, wherein said method for joining thermoplastic resin molded products comprises:

a first step in which electric resistance wire is sandwiched between the joining surfaces of two molded products which are to be joined, pressure is applied at a first predetermined pressure, and current of a predetermined value is applied for a predetermined time to the electric resistance wire, so that the resin around the electric resistance wire is melted by the thermal energy produced in the electric resistance wire while the joining surfaces of the two molded products are held apart at a predetermined interval; and a second step in which, following the conclusion of the first step, the current being applied to the electric resistance wire is stopped, and a second predetermined pressure is applied to join the molten resin under pressure, wherein a gapping means for holding apart at a predetermined interval the surfaces of the two molded products which are to be joined is provided in the first step only, and wherein the gapping means is a spacer of predetermined thickness, said spacer being interposed between the two molded products in the first step, and being removed from between the molded products in the second step.

2. A method for joining thermoplastic resin molded products together by pressing together joining surfaces of two molded products that are to be joined, with electric resistance wire therebetween, when such thermoplastic resin molded products are to be joined together, and by applying current to heat the electric resistance wire, so that resin around the electric resistance wire is melted and bonded under pressure to join the two molded products, wherein said method for joining thermoplastic resin molded products comprises:

a first step in which electric resistance wire is sandwiched between the joining surfaces of two molded products which are to be joined, pressure is applied at a first predetermined pressure, and current of a predetermined value is applied for a predetermined time to the electric resistance wire, so that the resin around the electric resistance wire is melted by the thermal energy produced in the electric resistance wire while the joining surfaces of the two molded products are held apart at a predetermined interval; and a second step in which, following the conclusion of the first step, the current being applied to the electric resistance wire is stopped, and a second predetermined pressure is applied to join the molten resin under pressure, wherein a gapping means for holding apart at a predetermined interval the surfaces of the two molded products which are to be joined is provided in the first step only, and wherein either of the molded products has a hole in at least the joining surface that is to be joined, and the other molded product has an annular junction that can be fitted to the hole.

3. A method for joining thermoplastic resin molded products together by pressing together joining surfaces of two molded products that are to be joined, with electric resistance wire therebetween, when such thermoplastic resin molded products are to be joined together, and by applying current to heat the electric resistance wire, so that resin around the electric resistance wire is melted and bonded under pressure to join the two molded products, wherein said method for joining thermoplastic resin molded products comprises:

a first step in which electric resistance wire is sandwiched between the joining surfaces of two molded products which are to be joined, pressure is applied at a first predetermined pressure, and current of a predetermined value is applied for a predetermined time to the electric resistance wire, so that the resin around the electric resistance wire is melted by the thermal energy produced in the electric resistance wire while the joining surfaces of the two molded products are held apart at a predetermined interval; and a second step in which, following the conclusion of the first step, the current being applied to the electric resistance wire is stopped, and a second predetermined pressure is applied to join the molten resin under pressure, wherein a gapping means for holding apart at a predetermined interval the surfaces of the two molded products which are to be joined is provided in the first step only, wherein either of the molded products has a hole in at least the joining surface that is to be joined, and the other molded product has an annular junction that can be fitted to the hole, and wherein either of the molded products is a hollow element having an opening in at least the joining surface that is to be joined, and the other molded product is a tubular element with a connecting portion that can be fitted to the opening.

* * * * *

UNITED STATES PATENT AND TRADEMARK OFFICE
CERTIFICATE OF CORRECTION

PATENT NO. : 6,368,448 B1
DATED : April 9, 2002
INVENTOR(S) : Masaharu Okamura et al.

It is certified that error appears in the above-identified patent and that said Letters Patent is hereby corrected as shown below:

<u>Title page,</u>
Item [30], Foreign Application Priority Data, please change the Priority Date from "Jan. 9, 1998" to -- Sept. 1, 1998 --.

Signed and Sealed this

Fifteenth Day of October, 2002

*Attest:*

*Attesting Officer*

JAMES E. ROGAN
*Director of the United States Patent and Trademark Office*